(12) United States Patent
Kim et al.

(10) Patent No.: US 12,289,273 B2
(45) Date of Patent: Apr. 29, 2025

(54) METHOD FOR TRANSMITTING AND RECEIVING DATA IN WIRELESS COMMUNICATION SYSTEM, AND APPARATUS THEREFOR

(71) Applicant: LG Electronics Inc., Seoul (KR)

(72) Inventors: Hyungtae Kim, Seoul (KR); Suckchel Yang, Seoul (KR); Jiwon Kang, Seoul (KR); Jonghyun Park, Seoul (KR); Daesung Hwang, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/439,332

(22) Filed: Feb. 12, 2024

(65) Prior Publication Data

US 2024/0187196 A1 Jun. 6, 2024

Related U.S. Application Data

(63) Continuation of application No. 17/431,255, filed as application No. PCT/KR2020/002100 on Feb. 14, 2020, now Pat. No. 11,949,625.

(Continued)

(30) Foreign Application Priority Data

Feb. 15, 2019 (KR) .................. 10-2019-0018195
May 1, 2019 (KR) .................. 10-2019-0051185

(51) Int. Cl.
*H04W 4/00* (2018.01)
*H04L 1/1812* (2023.01)
*H04L 5/00* (2006.01)

(52) U.S. Cl.
CPC .......... *H04L 5/0055* (2013.01); *H04L 1/1819* (2013.01); *H04L 5/0094* (2013.01)

(58) Field of Classification Search
CPC ... H04L 5/0055; H04L 1/1819; H04L 5/0094; H04L 1/0027; H04L 1/1664;
(Continued)

(56) References Cited

U.S. PATENT DOCUMENTS 10,341,057 B2 * 7/2019 Shen .................. H04L 1/18
2019/0297637 A1 * 9/2019 Liou .................. H04W 72/1273
(Continued)

FOREIGN PATENT DOCUMENTS

CN 114128188 A * 3/2022 .......... H04L 1/1812
TW 202110122 A * 3/2021 .......... H04L 1/1812
(Continued)

*Primary Examiner* — Thai Dinh Hoang
(74) *Attorney, Agent, or Firm* — Fish & Richardson P.C.

(57) ABSTRACT

In the present disclosure, disclosed are a method for transmitting and receiving data in a wireless communication system and an apparatus therefor. Particularly, a method by which a user equipment (UE) supported by a plurality of apparatuses comprising a first apparatus and a second apparatus transmits and receives data in a wireless communication system comprises the steps of: receiving first control information from the first apparatus and receiving second control information from the second apparatus; receiving data from at least one of the first apparatus or the second apparatus; and transmitting, to at least one of the plurality of apparatuses, first feedback information regarding the first apparatus and second feedback information regarding the second apparatus, wherein the first control information and the second control information each comprises a downlink assignment index (DAI), and the DAI may be set on the basis of an index related to the plurality of apparatuses.

20 Claims, 10 Drawing Sheets

Related U.S. Application Data

(60) Provisional application No. 62/909,188, filed on Oct. 1, 2019, provisional application No. 62/845,367, filed on May 9, 2019, provisional application No. 62/825,998, filed on Mar. 29, 2019.

(58) Field of Classification Search
CPC ..... H04L 1/1854; H04L 1/1896; H04L 1/001; H04L 1/1812; H04L 1/1861; H04L 5/0035; H04L 5/0064; H04W 56/00; H04W 72/1268; H04W 72/0446; H04W 72/23

See application file for complete search history.

(56) References Cited

U.S. PATENT DOCUMENTS

| | | | | |
|---|---|---|---|---|
| 2020/0196346 A1* | 6/2020 | Khoshnevisan | .......... | H04L 1/08 |
| 2020/0305134 A1* | 9/2020 | Noh | ....................... | H04L 5/0053 |
| 2020/0351129 A1* | 11/2020 | Kwak | .................... | H04W 80/02 |
| 2021/0014026 A1* | 1/2021 | Papasakellariou | .... | H04L 1/1861 |
| 2021/0014883 A1* | 1/2021 | Khoshnevisan | ...... | H04W 72/23 |
| 2021/0105750 A1* | 4/2021 | Khoshnevisan | ...... | H04L 5/0053 |
| 2021/0227521 A1* | 7/2021 | Khoshnevisan | ...... | H04L 1/1614 |
| 2022/0022235 A1* | 1/2022 | Khoshnevisan | ........ | H04L 5/001 |
| 2022/0149899 A1* | 5/2022 | Jung | ..................... | H04L 5/0044 |
| 2022/0294591 A1* | 9/2022 | Liu | ........................ | H04L 1/1864 |
| 2022/0330297 A1* | 10/2022 | Lei | ......................... | H04L 1/1812 |
| 2023/0045454 A1* | 2/2023 | Huang | .................. | H04L 1/1614 |
| 2023/0371039 A1* | 11/2023 | Tsai | .................... | H04W 72/232 |

FOREIGN PATENT DOCUMENTS

| | | | | | |
|---|---|---|---|---|---|
| WO | WO-2020198645 A1 * | 10/2020 | | ........... | H04L 1/1858 |
| WO | WO-2020245973 A1 * | 12/2020 | | ........... | H04L 1/1861 |
| WO | WO-2020264450 A1 * | 12/2020 | | ............. | H04B 7/024 |
| WO | WO-2021003620 A1 * | 1/2021 | | ........... | H04L 1/0031 |
| WO | WO-2021067190 A1 * | 4/2021 | | ........... | H04L 1/1614 |
| WO | WO-2021068140 A1 * | 4/2021 | | ........... | H04L 1/0061 |
| WO | WO-2021073020 A1 * | 4/2021 | | ........... | H04L 5/0053 |
| WO | WO-2021204275 A1 * | 10/2021 | | .............. | H04L 1/08 |
| WO | WO-2021231522 A1 * | 11/2021 | | ........... | H04L 1/1819 |
| WO | WO-2021248452 A1 * | 12/2021 | | ........... | H04L 1/1812 |

* cited by examiner (a)

(b)

METHOD FOR TRANSMITTING AND RECEIVING DATA IN WIRELESS COMMUNICATION SYSTEM, AND APPARATUS THEREFOR

CROSS-REFERENCE TO RELATED APPLICATIONS

This application is a continuation of U.S. application Ser. No. 17/431,255, filed on Aug. 16, 2021, which is a National Stage application under 35 U.S.C. § 371 of International Application No. PCT/KR2020/002100, filed on Feb. 14, 2020, which claims the benefit of U.S. Provisional Application No. 62/909,188, filed on Oct. 1, 2019, U.S. Provisional Application No. 62/845,367, filed on May 9, 2019, Korean Patent Application No. 10-2019-0051185, filed on May 1, 2019, U.S. Provisional Application No. 62/825,998, filed on Mar. 29, 2019, and Korean Patent Application No. 10-2019-0018195, filed on Feb. 15, 2019. The disclosures of the prior applications are incorporated by reference in their entirety.

TECHNICAL FIELD

The present disclosure relates to a wireless communication system, and more particularly, to a method for transmitting and receiving, by a user equipment (UE) supported by multiple transmission reception points (TRPs), data, and an apparatus therefor.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for transmitting and receiving, by a UE supported by multiple transmission reception points (TRPs), data in a wireless communication system.

Specifically, the present disclosure proposes a priority rule for determining which operation the UE is to perform, when resources of uplink channels (e.g., PUSCH, PUCCH) for each TRP overlap (i.e., overlapping between PUCCHs or overlapping between the PUCCH and the PUSCH), in the overlapped resources.

Further, the present disclosure proposes a method for jointly encoding HARQ-ACK information for multiple TRPs.

Further, according to an embodiment of the present disclosure, proposed is a method for configuring a DAI value included in each DCI by considering a situation in which DCI is received from each of multiple TRPs in the same PDCCH monitoring occasion.

Technical objects to be achieved in the disclosure are not limited to the aforementioned technical objects, and other technical objects not described above may be evidently understood by a person having ordinary skill in the art to which the disclosure pertains from the following description.

Technical Solution

In an aspect of the present disclosure, a method for transmitting and receiving, by a user equipment (UE) supported by multiple devices including a first device and a second device, data in a wireless communication system may include: receiving, from the first device, first control information, and receiving, from the second device, second control information; receiving data from at least one of the first device or the second device; and transmitting, to at least one of the multiple devices, first feedback information for the first device and second feedback information for the second device, in which each of the first control information and the second control information may include a Downlink Assignment Index (DAI), and the DAI may be configured based on indices related to the multiple devices.

Further, in the method according to an aspect of the present disclosure, the DAI may be configured by further considering an index of a serving cell and a time domain location in which control information is to be transmitted.

Further, in the method according to an aspect of the present disclosure, the indices related to the multiple devices may correspond to indices of a Control Resource Set (CORESET) group.

Further, in the method according to an aspect of the present disclosure, a value of the DAI may be configured in ascending order of the indices of the multiple devices.

Further, the method according to an aspect of the present disclosure may further include receiving, from at least one of the multiple devices, a configuration related to the time domain location, in which the first control information and the second control information may be received from the same cell having the same serving cell index at the same time domain location based on the configuration.

Further, in the method according to an aspect of the present disclosure, when a DAI included in the first control information and a DAI included in the second control information are equal to each other, a DAI value of a device corresponding to a lower index among the first device and the second device may be replaced with a value acquired by subtracting 1 from the DAI value of the device corresponding to the lower index.

Further, in the method according to an aspect of the present disclosure, the first control information and the second control information may be received from CORESETs of different CORESET groups.

Further, in the method according to an aspect of the present disclosure, the first feedback information and the second feedback information may be jointly encoded and transmitted through one uplink channel.

Further, in the method according to an aspect of the present disclosure, the first feedback information and the second feedback information may be encoded based on a bit number of feedback information having a larger payload size among the first feedback information and the second feedback information.

Further, in the method according to an aspect of the present disclosure, the first control information and the second control information may be configured as a pair, and the first feedback information and the second feedback information may be encoded with a bit number corresponding to the sum of a bit number of the first feedback information and a bit number of the second feedback information.

Further, in the method according to an aspect of the present disclosure, when a resource for the first feedback information and a resource for the second feedback information overlap with each other, one of the first feedback information or the second feedback information may be dropped based on a priority rule.

Further, in the method according to an aspect of the present disclosure, the priority rule may be based on the value of the DAI.

Further, in the method according to an aspect of the present disclosure, the resource for the first feedback information and the resource for the second feedback information may be included in the same sub slot.

Further, in the method according to an aspect of the present disclosure, when the resource for the first feedback information overlaps with a resource for uplink data to be transmitted to the second device, one of the first feedback information or the uplink data may be dropped based on contents included in the uplink data.

In another aspect of the present disclosure, a user equipment (UE) for transmitting and receiving data in a wireless communication system may include: one or more transceivers; one or more processors; and one or more memories storing instructions for operations executed by the one or more processors and connected to the one or more processors, in which the operations may include receiving, from a first device, first control information, and receiving, from a second device, second control information, receiving data from at least one of the first device or the second device, and transmitting, to at least one of the first device or the second device, first feedback information for the first device and second feedback information for the second device, and each of the first control information and the second control information may include a Downlink Assignment Index (DAI), and the DAI may be configured based on indices related to the first device and the second device.

In yet another aspect of the present disclosure, a method for transmitting and receiving, by a base station (BS), data in a wireless communication system may include: transmitting, to a user equipment (UE), control information; transmitting, to the UE, data based on the control information; and receiving, from the UE, feedback information for the control information or for the data, in which the control information may include a Downlink Assignment Index (DAI), and the DAI may be configured based on an index related to the BS.

In still yet another aspect of the present disclosure, a base station (BS) for transmitting and receiving data in a wireless communication system may include: one or more transceivers; one or more processors; and one or more memories storing instructions for operations executed by the one or more processors and connected to the one or more processors, in which the operations may include transmitting, to a user equipment (UE), control information, transmitting, to the UE, data based on the control information, and receiving, from the UE, feedback information for the control information or for the data, and the control information may include a Downlink Assignment Index (DAI), and the DAI may be configured based on an index related to the BS.

In still yet another aspect of the present disclosure, an apparatus comprising: one or more memories and one or more processors functionally connected to the one or more memories, in which the one or more processors may control the apparatus to receive first control information and second control information, receive data based on at least one of the first control information or the second control information, and transmit feedback information for the data, and each of the first control information and the second control information may include a Downlink Assignment Index (DAI), and the DAI may be configured based on an index related to a CORESET group from which the first control information and the second control information are received.

In still yet another aspect of the present disclosure, in one or more non-transitory computer-readable media storing one or more instructions, the one or more instructions executable by one or more processors may include instructions for instructing a user equipment (UE) to receive, from a first device, first control information, and receive, from a second device, second control information, receive data from at least one of the first device or the second device, and transmit, to at least one of the first device or the second device, first feedback information for the first device and second feedback information for the second device, and each of the first control information and the second control information includes a Downlink Assignment Index (DAI), and the DAI may be configured based on indices related to the devices.

Advantageous Effects

According to an embodiment of the present disclosure, when resources of uplink channels (e.g., PUSCH, PUCCH) for each TRP overlap (i.e., overlapping between PUCCHs or overlapping between the PUCCH and the PUSCH), a UE can transmit information having a higher priority based on a priority rule.

Further, according to an embodiment of the present disclosure, the priority rule can be defined/configured.

Further, according to an embodiment of the present disclosure, HARQ-ACK information for multiple TRPs can be jointly encoded and transmitted to at least one of multiple TRPs through one PUCCH channel, and the UE can jointly encode ACK/NACK codebooks for multiple TRPs together even though a reception of DCI or data transmitted by one of multiple TRPs is failed.

Further, according to an embodiment of the present disclosure, a DAI value included in each DCI can be sequentially configured by considering a situation in which each DCI is received from each of multiple TRPs in the same PDCCH monitoring occasion.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute a part of this disclosure illustrate embodiments of the disclosure and together with the description serve to explain the principles of the disclosure.

MODE FOR DISCLOSURE

Figure 1:
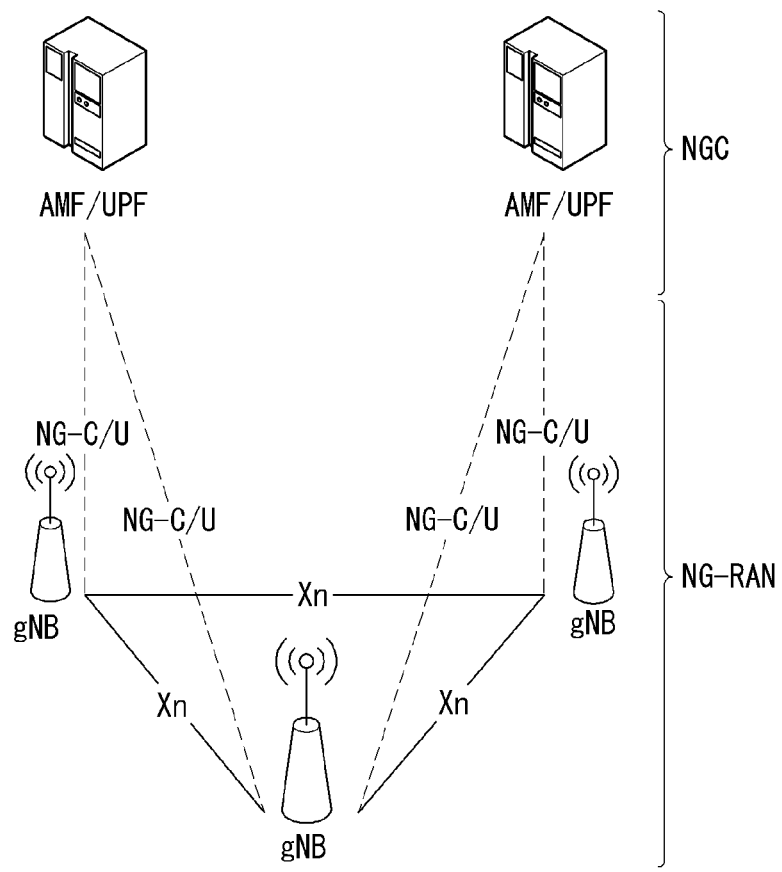
FIG. 1 is a diagram illustrating an example of an overall system structure of NR to which a method proposed in the disclosure may be applied.

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE 36.211: Physical channels and modulation
36.212: Multiplexing and channel coding
36.213: Physical layer procedures
36.300: Overall description
36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerolouy and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$ In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms In this case, there may be a set of UL frames and a set of DL frames.

Figure 2:
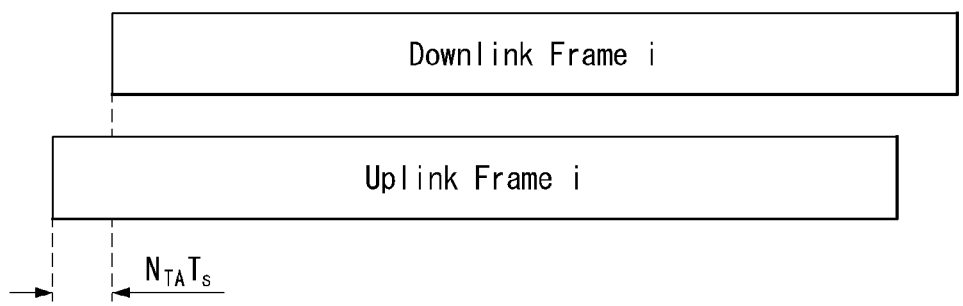
FIG. 2 illustrates a relationship between an uplink frame and a downlink frame in a wireless communication system to which a method proposed in the disclosure may be applied.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slots}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
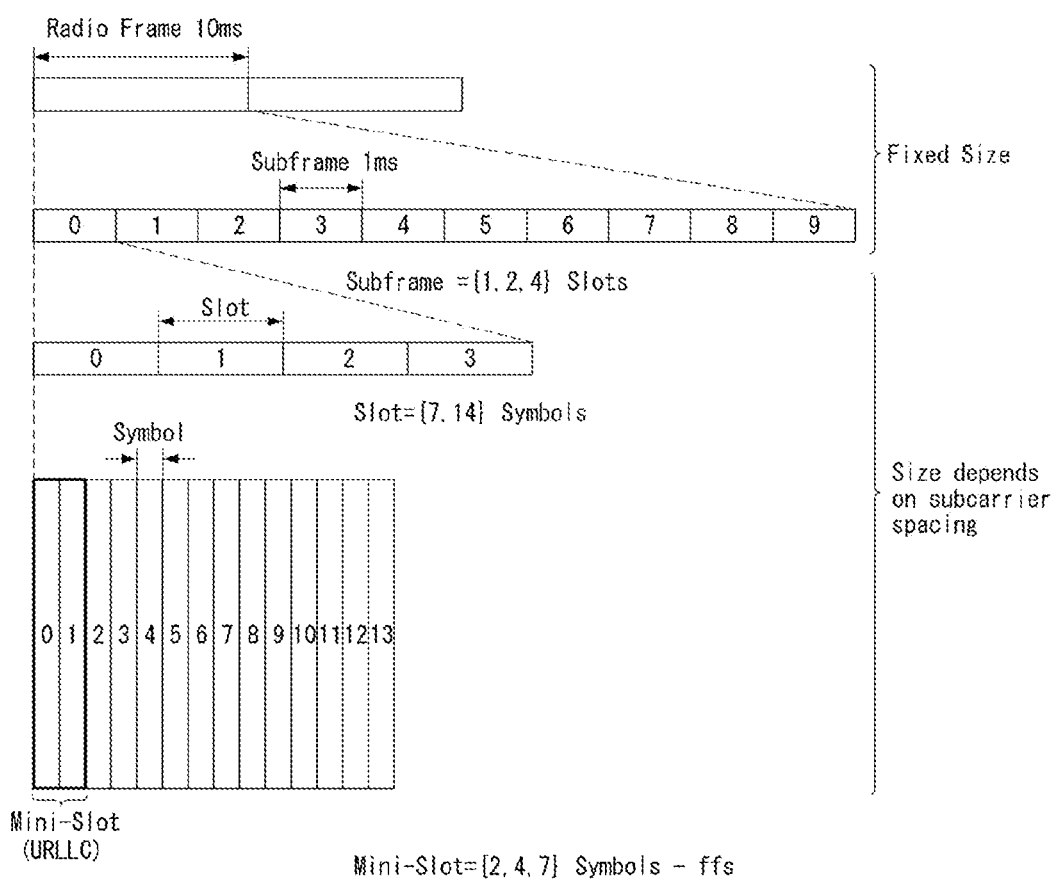
FIG. 3 illustrates an example of a frame structure in an NR system.

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
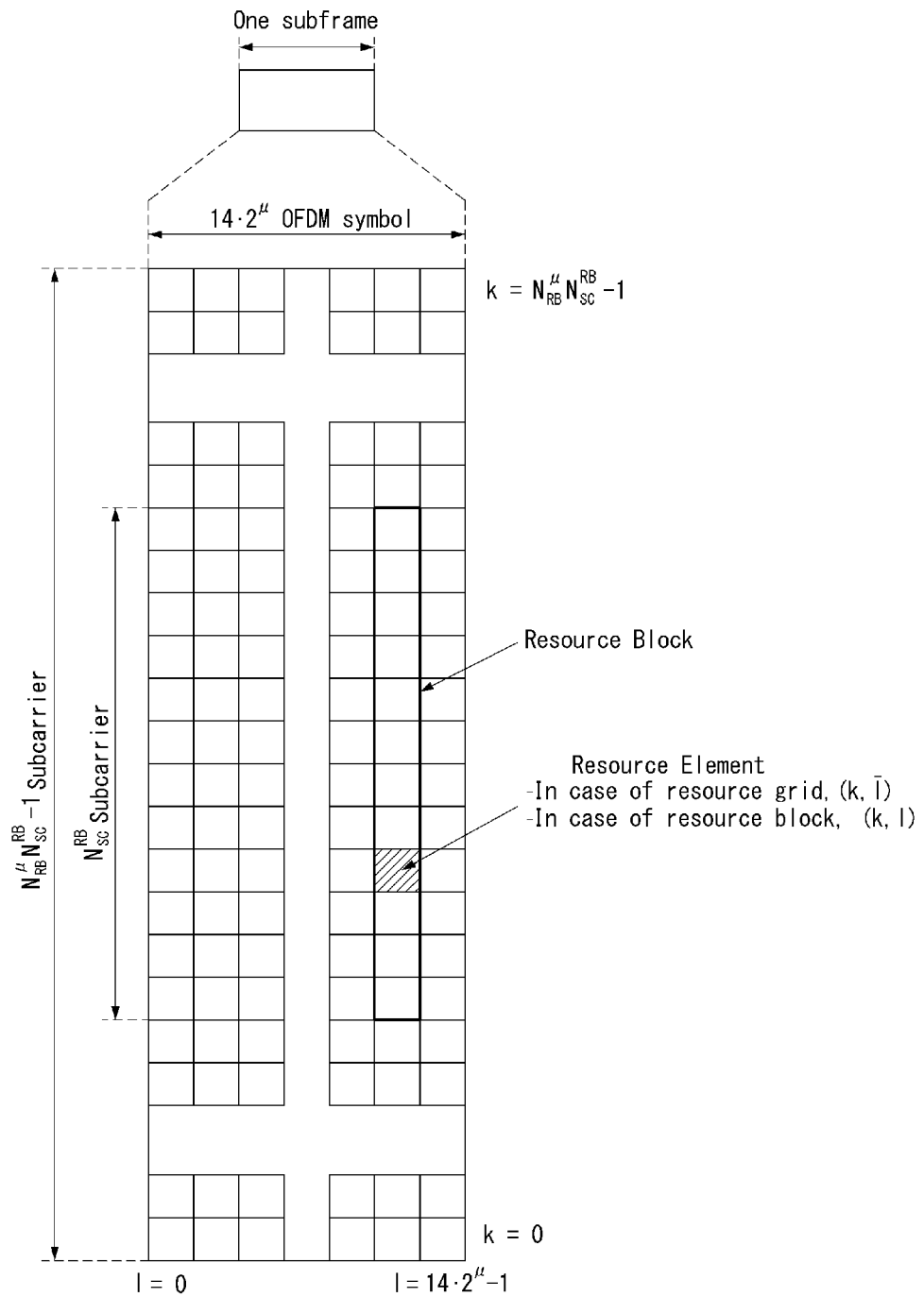
FIG. 4 illustrates an example of a resource grid supported by a wireless communication system to which a method proposed in the disclosure may be applied.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·29 OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

Figure 5:
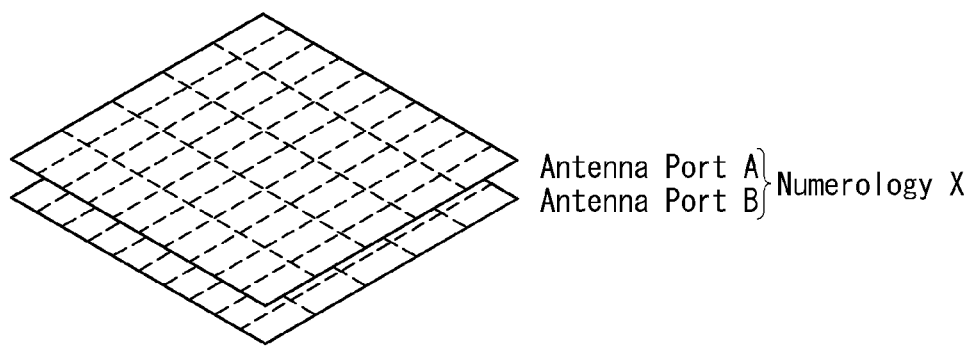
FIG. 5 illustrates examples of a resource grid for each antenna port and numerology to which a method proposed in the disclosure may be applied.
Figure 5:
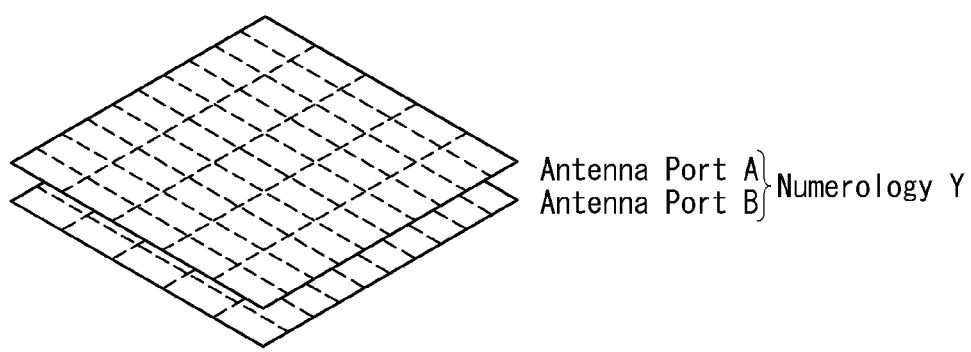

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄) where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu-1$.

The resource element (k,l̄) for the numerology μ and the antenna port p corresponds to a complex value $a_{k,l̄}^{(p,\mu)}$. When there is no risk for confusion or when a specific antenna port or numerology is not specified, the indices p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration µ coincides with "point A". A common resource block number $n_{CRB}^{\mu}$ in the frequency domain and resource elements (k, l) for the subcarrier spacing configuration µ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

Figure 6:
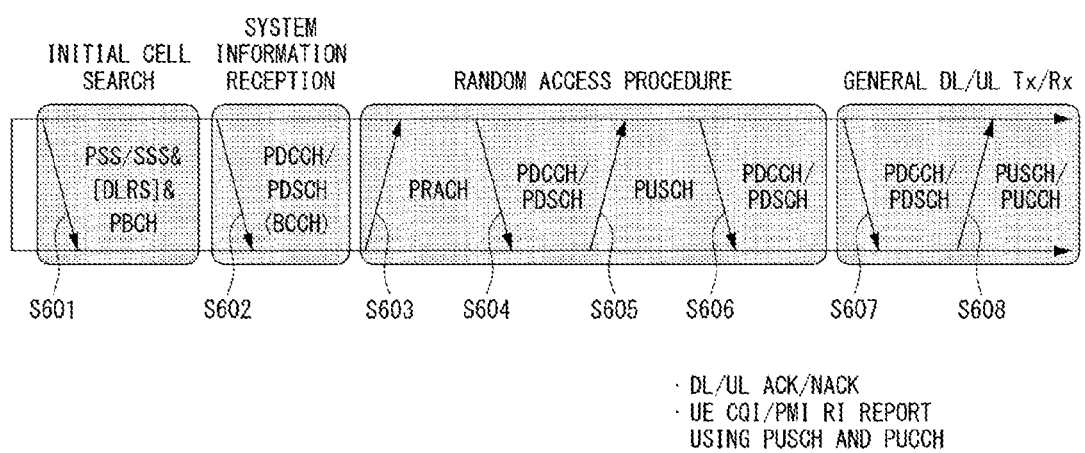
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Downlink and Uplink Transmission/Reception Operation

Downlink (DL) Transmission and Reception Operation

Figure 7:
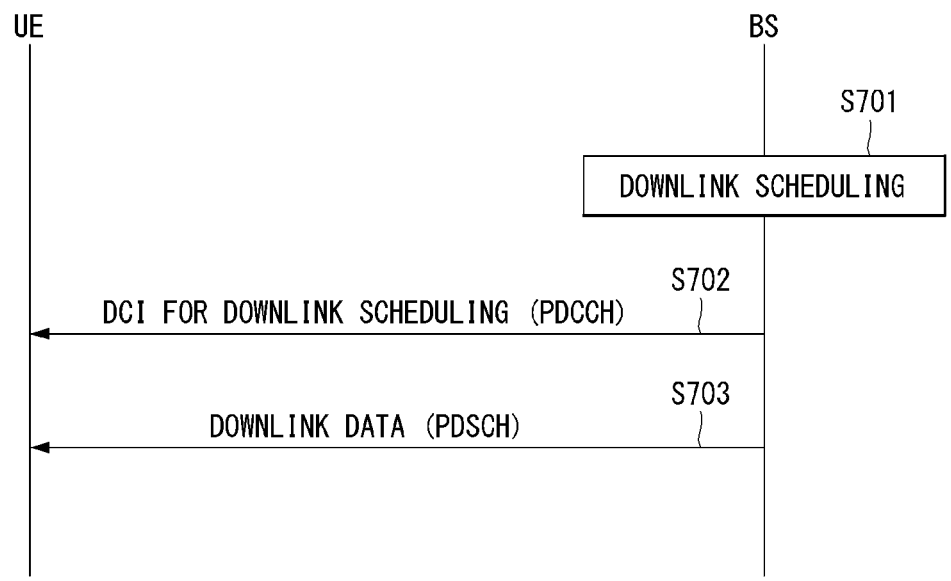
FIG. 7 illustrates an example of a downlink transmission/reception operation.

FIG. 7 illustrates an example of a downlink transmission and reception operation.

Referring to the FIG. 7, The eNB may schedule downlink transmission such as the frequency/time resource, the transport layer, an downlink precoder, the MCS, etc., (S701). Specifically, the eNB may determine abeam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled, and single-user (SU)/Multi-user (MU) transmission scheduling is also available. Further, a TCI field is configured with 3 bits, and the QCL for the DMRS may be dynamically indicated by indicating a maximum of 8 TCI states according to a TCI field value. And, the UE may receive downlink data from the eNB on the PDSCH (S703). When the UE detects a PDCCH including the DCI format 1_0 or 1_1, the UE may decode the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

The transport block may be constituted by one or more code block groups (CBGs) and one CBG may be constituted by one or more code blocks (CBs). Further, in the NR system, in addition transport block-unit data transmission/reception, CB/CBG-unit data transmission/reception may be possible. Accordingly, CB/CBG-unit ACK/NACK transmission and retransmission may also be possible. The UE may receive, from the BS, information on the CB/CBG through DCI (e.g., DCI format 01, DCI format 11, etc.). Further, the UE may receive, from the BS, information on a data transmission unit (e.g., TB/CB/CBG).

Uplink Transmission and Reception Operation

Figure 8:
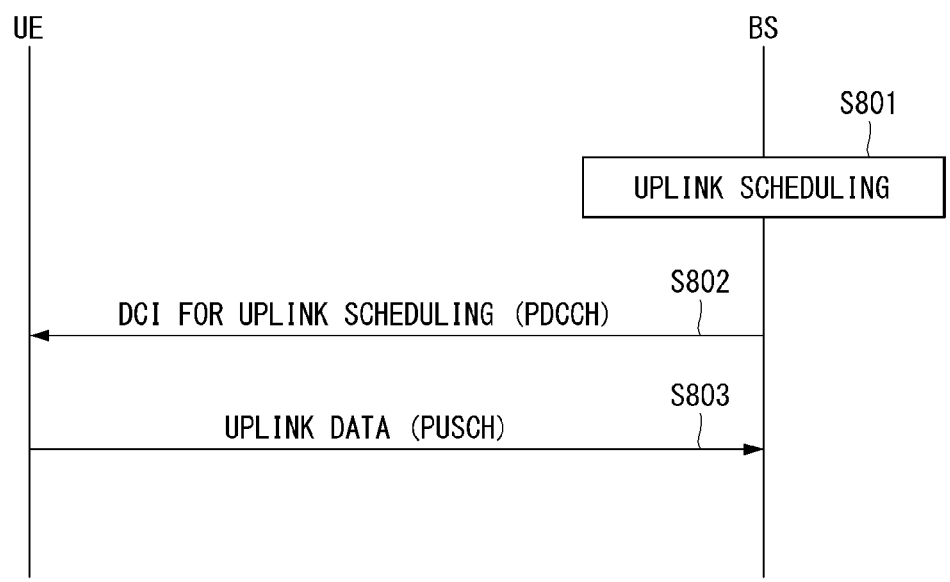
FIG. 8 illustrates an example of an uplink transmission/reception operation.

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for downlink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. Codebook based transmission scheme and non-codebook based transmission scheme are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 00, DCI format 01, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Multi-Transmission/Reception Point (TRP) Related Operation

A technique of Coordinated Multi Point (CoMP) refers to a scheme in which a plurality of base stations exchange (e.g., use the X2 interface) or utilize channel information (e.g., RI/CQI/PMI/LI, etc.) fed back from the UE, coordinated transmission to the UE, to effectively control interference. According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

M-TRP (Multiple TRP) Transmission

An M-TRP transmission scheme in which M TRPs transmit data to one user equipment (UE) may be divided into two main types, eMBB M-TRP transmission which is a scheme for increasing a transmission rate and URLLC M-TRP transmission which is a scheme for increasing a reception success rate and reducing latency.

Further, in terms of downlink control information (DCI) transmission, the multiple (M)-TRP transmission scheme may be divided into i) a multiple (M)-DCI based M-TRP transmission scheme in which each TRP transmits different DCI and ii) a single (S)-DCI based M-TRP transmission scheme in which one TRP transmits the DCI. As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

In TDM based URLLC, standardization for scheme 3/4 is being discussed. Specifically, scheme 4 means a scheme in which one TRP transmits the TB in one slot and has an effect of increasing a data reception probability through the same TB received from multiple TRPs in multiple slots. Unlike this, scheme 3 means a scheme in which one TRP transmits the TB through several consecutive OFDM symbols (i.e., symbol group), and may be configured in such a manner that multiple TRPs transmit the same TB through different symbol groups in one slot.

Further, the UE may recognize PUSCH (or PUCCH) scheduled by DCI received in different CORESETs (or CORESETs which belong to different CORESET groups) as PUSCH (or PUCCH) transmitted to different TRPs or PUSCH (or PUCCH) of different TRPs. Further, a scheme for UL transmission (e.g., PUSCH/PUCCH) transmitted to different TRPs may be applied equally even to UL transmission (e.g., PUSCH/PUCCH) transmitted to different panels which belong to the same TRP.

Further, MTRP-URLLC may mean that M TRPs transmit the same transport block (TB) by using different layers/times/frequencies. It may be assumed that a UE which is configured with an MTRP-URLLC transmission scheme is indicated with multiple TCI state(s) through the DCI and data received by using a QCL RS of each TCI state are the same TB. On the contrary, MTRP-eMBB may mean that M TRPs transmit different TBs by using different layers/times/frequencies. It may be assumed that a UE which is configured with an MTRP-eMBB transmission scheme is indicated with multiple TCI state(s) through the DCI and the data received by using the QCL RS of each TCI state are different TBs. In this regard, as the UE separately uses an RNTI configured for a purpose of MTRP-URLLC and an RNTI configured for a purpose of MTRP-eMBB, the UE may determine/decide whether the corresponding M-TRP transmission, URLLC transmission or eMBB transmission. That is, when CRC masking of the DCI received by the UE is performed by using the RNTI configured for the purpose of the MTRP-URLLC, this may correspond to the URLLC transmission and when the CRC masking of the DCI is performed by using the RNTI configured for the purpose of the MTRP-URLLC, this may correspond to the eMBB transmission.

Description of Multiple DCI Based NCJT/Single DCI Based NCJT

Non-coherent joint transmission (NCJT) is a method in which multiple transmission points (TPs) transmit data to one user equipment (UE) by using the same time frequency, and the TPs mutually transmit the data to different layers by using different Demodulation Multiplexing Reference Signal (DMRS) ports. The TP delivers data scheduling information to a UE that performs NCJT reception through downlink control information (DCI), and in this case, a scheme in which each TP which participates in the NCJT delivers scheduling information for data transmitted thereby through the DCI is referred to as multi DCI based NCJT. Since each of N TPs which particulate NCJT transmission transmits, to the UE, DL grant DCI and PDSCH, the UE receives, from N TPs, N DCIs and N PDSCHs. Unlike this, a scheme in which one representative TP delivers scheduling information for data transmitted thereby and data transmitted by another TPs through one DCI is referred to as single DCI based NCJT. In this case, N TPs transmit one PDSCH, but each TP transmits only some layers of multiple layers comprising one PDSCH. For example, when 4-layer data is transmitted, TP 1 transmits 2 layers and TP 2 transmits, to the UE, 2 remaining layers.

Multiple TRPs (MTRPs) performing NCJT transmission may perform DL data transmission to the UE by one of two following schemes.

First, a single DCI based MTRP scheme is described. MTRPs transmit one common PDSCH in coordination with each other together and each TRP which participates in coordinated transmission spatially splits the corresponding PDSCH into different layers (i.e., different DMRS ports) and transmits the corresponding PDSCH. In this case, scheduling information for the PDSCH is indicated to the UE through one DCI, and the corresponding DCI indicates which DMRS port uses which QCL RS and QCL type of information (this is different from indicating QCL and TYPE to be commonly applied to all DMRS ports indicated by the DCI in the related art). That is, M TCI states are indicated through a TCI field in the DCI (in the case of 2 TRP coordinated transmission, M=2), and the QCL RS and type are determined by using M different TCI states for each of M DMRS port groups. Further, DMRS port information may be indicated by using a new DMRS table.

Second, a multiple DCI based MTRP scheme is described. MTRPs transmit different DCIs and PDSCHs, and (some or all of) the corresponding PDSCHs are overlapped and transmitted on different frequency time resources. The corresponding PDSCHs may be scrambled through different scrambling IDs and the corresponding DCIs may be transmitted through Coresets which belong to different Coreset groups (Coreset group may be determined as an index defined a Coreset configuration of each Coreset, and for example, if index=0 is configured in Coresets 1 and 2 and index=1 is configured in Coresets 3 and 4, Coresets 1 and 2 belongs to Coreset group 0 and Coresets 3 and 4 belong to Coreset group 1. Further, in a case where the index in the Coreset is not defined, the case may be construed as index=0. When a plurality of scrambling IDs is configured or two or more Coreset groups are configured in one serving cell, it can be seen that the UE receives data by a multiple DCI based MTRP operation.

As an example, whether the used scheme is the single DCI based MTRP scheme or the multiple DCI based MTRP scheme may be indicated to the UE through separate signaling. As an example, when multiple CRS patterns are indicated to the UE for the MTRP operation with respect to one serving cell, PDSCH rate matching for the CRS may vary depending on whether the used scheme is the single DCI based MTRP scheme or the multiple DCI based MTRP scheme.

Hereinafter, CORESET group ID described/mentioned in the present disclosure may mean index/identification information (e.g., ID) for distinguishing CORESET for each TRP/panel. In addition, a CORESET group may be a group/union of CORESETS which are distinguished by the index/identification information (e.g., ID)/the CORESET group ID, etc., for distinguishing the CORESET for each TRP/panel/. As an example, the CORESET group ID may specific index information defined a CORESET configuration. As an example, the CORESET group may be configured/indicated/defined by an index defined in the CORESET configuration for each CORESET. And/or the CORESET group ID may mean an index/identification information/indicator for distinguishing/identifying CORESETs configured in/associated with each TRP/panel, and the CORESET group ID described/mentioned in the present disclosure may be a specific index/specific identification information/specific indicator for distinguishing/identifying the CORESETs configured in/related to each TRP/panel. The CORESET group ID, i.e., the specific index/specific identification information/specific indicator for distinguishing/identifying the CORESETs configured in/related to each TRP/panel may be configured/indicated higher layer signaling (e.g., RRC signaling)/L2 signaling (e.g., MAC-CE)/L1 signaling (e.g., DCI). As an example, PDCCH detection for each TRP/panel may be configured/indicated to be performed in units of corresponding CORESET group and/or uplink control information (e.g., CSI, HARQ-A/N, SR) and/or uplink physical channel resources (e.g., PUCCH/PRACH/SRS resources) may be configured/indicated to be separated, and managed/controlled, and/or HARQ A/N (process/retransmission) for PDSCH/PUSCH scheduled for each TRP/panel may be managed in units of corresponding CORESET group.

Description of Partially Overlapped NCJT

Further, the NCJT is divided into fully overlapped NCJT in which time frequency resources transmitted by respective TPs are fully overlapped and partially overlapped NCJT in which only some time frequency resources are overlapped. That is, in the case of the partially overlapped NCJT, both transmission data of TP1 and TP2 are transmitted in some time frequency resources, and only one TP of TP1 or TP2 transmits data in the remaining time frequency resources.

Reliability Enhancement Scheme in Multi-TRP

Figure 9:
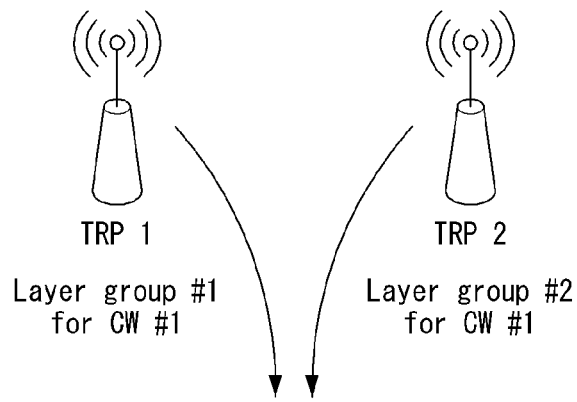
FIG. 9 illustrates an example of a transmission/reception method for reliability enhancement using transmission in multiple TRPs.
Figure 9:
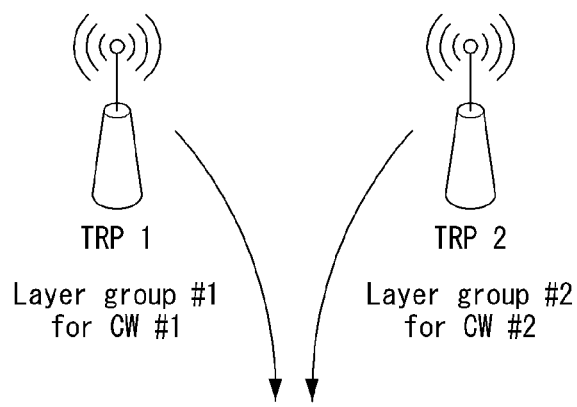

As a transmission/reception method for reliability enhancement using transmission in multiple TRPs, two following methods may be considered. FIG. 9 illustrates an example of a transmission/reception method for reliability enhancement using transmission in multiple TRPs.

The example of FIG. 9(a) illustrates a case where layer groups transmitting the same codeword (CW)/TB correspond to different TRPs. In this case, the layer group may mean a kind of layer set comprising one layer or one or more layers. In this case, there is an advantage in that a quantity of transmission resources increases due to multiple layers and robust channel coding robust of a low coding rate may be used for the transport block (TB) through the increased transmission resource quantity and further, since channels from multiple TRPs are different, reliability enhancement of a received signal may be expected based on a diversity gain.

Meanwhile, the example of FIG. 9(b) illustrates an example of transmitting different CWs through layer groups corresponding to different TRPs. In this case, it may be assumed that TBs corresponding to CW #1 and CW #2 of the figure are the same as each other. Accordingly, the example may be regarded as an example of repeated transmission of the same TB. The case of FIG. 9(b) may have a disadvantage that the coding rate corresponding to the TB is high as compared with the case of FIG. 9(a). However, there is an advantage in that the coding rate may be adjusted by indicating different redundancy version (RV) values for encoding bits generated from the same TB according to a channel environment or a modulation order of each CW may be controlled.

In FIG. 9(a)/9(b) above, as the same TB is repeatedly transmitted through different layer groups and different TRPs/panels transmit each layer group, a data reception probability may be increased and this is referred to as an SDM based M-TRP URLLC transmission scheme. Layers which belong to different layer groups are transmitted through DMRS ports which belong to different DMRS CDM groups, respectively.

Further, the above-described contents related to multiple TRPs are described based on a spatial division multiplexing (SDM) scheme using different layers, but this may be, of course, extensively applied even to a frequency division multiplexing (FDM) scheme based on different frequency domain resources (e.g., RB/PRB (set) and/or a time division multiplexing (TDM) scheme based on different time domain resources (e.g., slot, symbol, sub-symbol).

Discussed Contents Related to Multi-TRP

Schemes for multi-TRP based URLLC, scheduled by single DCI at least, are clarified as following.

Scheme 1 (SDM): n (n<=Ns) TCI states within the single slot, with overlapped time and frequency resource allocation Scheme 1a: Each transmission occasion is a layer or a set of layers of the same TB, with each layer or layer set is associated with one TCI and one set of DMRS port(s). Single codeword with one RV is used across all spatial layers or layer sets. From the UE perspective, different coded bits are mapped to different layers or layer sets with the same mapping rule as in Rel-15.

Scheme 1b: Each transmission occasion is a layer or a set of layers of the same TB, with each layer or layer set is associated with one TCI and one set of DMRS port(s). Single codeword with one RV is used for each spatial layer or layer set. The RVs corresponding to each spatial layer or layer set can be the same or different.

Scheme 1c: One transmission occasion is one layer of the same TB with one DMRS port associated with multiple TCI state indices, or one layer of the same TB with multiple DMRS ports associated with multiple TCI state indices one by one.

For Scheme 1a and 1c, the same MCS is applied for all layers or layer sets.

In the case of Scheme 1b, the same or different MCS/modulation order may be discussed for different layers or layer sets.

Scheme 2 (FDM): n (n<=Ns) TCI states within the single slot, with non-overlapped frequency resource allocation Each non-overlapped frequency resource allocation is associated with one TCI state.

Same single/multiple DMRS port(s) are associated with all non-overlapped frequency resource allocations.

Scheme 2a: Single codeword with one RV is used across full resource allocation. From UE perspective, the common RB mapping (codeword to layer mapping) is applied across full resource allocation.

Scheme 2b: Single codeword with one RV is used for each non-overlapped frequency resource allocation. The RVs corresponding to each non-overlapped frequency resource allocation can be the same or different.

For scheme 2a, same MCS is applied for all non-overlapped frequency resource allocations.

In the case of Scheme 2b, the same or different MCS/modulation order may be discussed for different non-overlapping frequency resource allocation.

Details of a frequency resource allocation mechanism for FDM 2a/2b related to allocation granularity and time domain allocation may be discussed.

Scheme 3 (TDM): n (n<=Nt1) TCI states within the single slot, with non-overlapped time resource allocation Each transmission occasion of the TB has one TCI and one RV with the time granularity of mini-slot.

All transmission occasion (s) within the slot use a common MCS with same single or multiple DMRS port(s).

RV/TCI state can be same or different among transmission occasions.

Scheme 4 (TDM): n (n<=Nt2) TCI states with K (n<=K) different slots.

Each transmission occasion of the TB has one TCI and one RV

All transmission occasion (s) across K slots use a common MCS with same single or multiple DMRS port(s).

RV/TCI state can be same or different among transmission occasions.

M-TRP/panel based URLLC schemes should be compared in terms of improved reliability, efficiency, and specification impact. For reference, supporting a layer number per TRP may be discussed.

A TCI indication framework should be at least strengthened in Rel-16 for eMBB.

Each TCI codepoint of the DCI may correspond to one or two TCI states. When two TCI states are activated within the TCI codepoint, each TCI state at least corresponds to one CDM group for DMRS type 1.

In the TRP related description in the present disclosure, the TRP may be replaced with a base station, a transmission point (TP), a cell (e.g., macro cell/small cell/pico cell), an antenna array, or a panel, and appreciated.

The above descriptions may be used/applied for the method and/or embodiments proposed in the present disclosure. In the present disclosure, '/' may mean that all of the contents distinguished by/are included (and) or only some of the distinguished contents are included (or). Further, in the present disclosure, the following terms are unified and used for convenience of description. However, the terms do not limit the scope of the present disclosure.

TRP: Transmission Reception Point
UE: User Equipment
CoMP: Coordinated Multi-Point
NCJT: Non-Coherent Joint Transmission
BH: Backhaul QCL: Quasi-co-location
PDSCH: Physical Downlink Shared Channel
PUCCH: Physical Uplink Control Channel
PUSCH: Physical Uplink Shared Channel
RRC: Radio Resource Control
MAE-CE: MAC-Control Element
DCI: Downlink Control Information
UCI: Uplink Control Information
DAI: Downlink Assignment Index
RE: Resource Element
CB: Code Block
CBG: Code Block Group
RB: Resource Block
TB: Transmission Block
TDM: Time Division Multiplex
SS: Search Space
RNTI: Radio Network Temporary Identifier CRC: Cyclic Redundancy Check
A/N: ACK/NACK(NAK)
TCI: Transmission Configuration Indicator
SR: Schedule Request
CSI: Channel State Information Hereinafter, in the present disclosure, for convenience of the description, it is assumed that two TRPs (e.g., TRP1 and TRP2) perform an NCJT operation for one UE, and operate in multiple DCI based NCJT of transmitting different DCIs and PDSCHs for each TRP. In other words, the UE may receive the DCI and the PDSCH scheduled by the DCI through CORESETs which belong to different CORESET groups, and in this case, the UE may recognize that different TRPs transmit the DCI and/or PDSCH. Further, the case where time resources (e.g., a symbol, a slot, a sub slot, etc.) are overlapped will be primarily described. However, the assumptions are just for convenience of the description and do not limit the scope of the present disclosure. Accordingly, the assumptions three or more TRPs may be extensively applied even to a case where three or more TRPs operate in the NCJT. Further, the assumptions may be, of course, applied even to a case where the time resource, the frequency resource, or the time and frequency resources are overlapped.

For convenience of the description, a plurality of TRPs/a plurality of UEs/each TRP will be represented by using numbers in order to distinguish data (e.g., PDSCH), resource, etc., transmitted thereby. As an example, multiple TRPs may be expressed as TRP1, TRP2, etc., UEs may be expressed as UE1, UE2, etc., PDSCHs transmitted by each TRP may be expressed as PDSCH1, PDSCH2, PDSCH3, etc., a resource configured by TRP1 may be represented as resource 1, and a resource configured by TRP2 may be represented as resource 2. The numbers are just arbitrarily allocated in order to distinguish each object and do not limit the scope of the present disclosure.

Table 5 shows an example of NCJT data transmission and A/N feedback of two TRPs connected through non-ideal backhaul (BH). Table 5 shows DL grant DCI which the BS transmits to one UE and an example in which ACK/NACK (A/N) feedback of PDSCHs scheduled by the DCI is performed in slot 10.

TABLE 5

| Slot 1 | Slot 2 | Slot 3 | Slot 4 | Slot 5 | Slot 6 | Slot 7 | Slot 8 | Slot 9 | Slot 10 |
|---|---|---|---|---|---|---|---|---|---|
| DAI = 1 From TRP 1 | DAI = 1 From TRP 2 | | PDSCH 1-1 PDSCH 1-2 | | DAI = 2 From TRP 1 | DAI = 2 From TRP 2 | | PDSCH 2-1 PDSCH 2-2 | A/N |

Referring to Table 5, TRP1 transmits DCI in slots 1 and 6, transmits two PDSCHs (e.g., PDSCH 1-1 and PDSCH 2-1) corresponding to two DCIs before slot 10, and instructs the UE to feedback A/N for two PDSCHs in slot 10 through PUCCH resource 1. TRP2 transmits DCI in slots 2 and 7, transmits two PDSCHs (e.g., PDSCH 1-2 and PDSCH 2-2) corresponding to two DCIs before slot 10, and instructs the UE to feed back A/N for two PDSCHs in slot 10 through PUCCH resource 2. A DAI value of slot 1, 2, 6, or 7 in Table 5 indicates a DAI field value in the DCI transmitted in a corresponding slot.

In Table 5, by assuming a case where a BH delay between TRPs is large, each TRP independently configures the DAI value and also independently configures a PUCCH for A/N feedback. As a result, the UE should configure an independent codebook for each TRP and transmit A/N through an independent PUCCH.

Specifically, each of DCIs of slot 1 and slot 2 in Table 5 schedules PDSCH 1-1 transmitted by TRP1 and PDSCH 1-2 transmitted by TRP2, respectively and each TRP simultaneously transmits the corresponding PDSCHs (i.e., PDSCH 1-1 and PDSCH 1-2) by NCJT in slot 4. each of DCIs of slot 6 and slot 7 schedules PDSCH 2-1 transmitted by TRP1 and PDSCH 2-2 transmitted by TRP2, respectively and each TRP simultaneously transmits the corresponding PDSCHs (i.e., PDSCH 2-1 and PDSCH 2-2) by NCJT in slot 9. All A/N for PDSCH 1-1, PDSCH 1-2, PDSCH 2-1, and PDSCH 2-2 should be reported in slot 10, A/N for PDSCH 1-1 and PDSCH 2-1 is indicated to be reported through PUCCH resource 1 indicated by TRP1, and A/N for PDSCH 1-2 and PDSCH 2-2 is indicated to be reported through PUCCH resource 2 indicated TRP2.

It is necessary to consider an operation method when even some of two PUCCH resources (e.g., PUCCH resource 1 and PUCCH resource 2) overlap (i.e., collide) with each other in a situation in which the UE is configured to transmit A/N corresponding to data (e.g., PDSCHs 1-1 and 2-1) transmitted by TRP1 to PUCCH resource 1 and transmit A/N corresponding to data (e.g., PDSCHs 1-2 and 2-2) transmitted by TRP2 in slot 10 (the same slot). For example, in a situation such as i) a case where even one RE overlaps, ii) a case where two PUCCHs are configured in the same slot even though REs do not overlap, or iii) a case where two PUCCHs use the same OFDM symbol even though the REs do not overlap, operations of proposal methods (e.g., proposal method 1/proposal method 2/proposal method 3/proposal method 4) in the present disclosure to be described below may be applied.

In Table 5, the BS configures, to the UE, two CORESET groups (one CORESET group may be comprised of one or more CORESETs and CORESET group ID for identifying the CORESET group may be defined), each of two TRPs is linked/mapped to one different CORESET group 1:1, and each TRP transmits the DCI by using the CORESET in the linked CORESET group. For example, CORESET group 1 is used for TRP1 to transmit the DCI and CORESET group 2 is used for TRP2 to transmit the DCI.

The UE assumes that DCIs received through different CORESET groups are transmitted from different TRPs and separately generates an A/N codebook of data scheduled by the DCIs received through different CORESET groups. The UE recognizes PUSCH (or PUCCH) scheduled by DCIs received by different CORESETs (or CORESETs which belong to different CORESET groups) as PUSCH (or PUCCH) transmitted to different TRPs or PUSCH (or PUCCH) of different TRPs.

In the legacy Rel-15 NR standard, since there is no CORESET group concept, it may be considered that all CORESETs belong to one CORESET group. If the UE receives multiple DCIs through one CORESET group and is configured with an A/N reporting PUCCH resource through each DCI, when the PUCCH resources are configured in the same slot, A/N for data allocated by each DCI is reported at once through a most recent configured PUCCH resource.

However, in the multi-TRP transmission scheme, when a backhaul link delay between TRPs is large, the A/N operation may be unsuitable. The reason is that since A/Ns for data of TRP1 and data of TRP2 are reported to one TRP (e.g., TRP1) through one PUCCH resource, a delay occurs in the process of delivering the A/N for the data of TRP2 from TRP1 to TRP2 through backhaul.

In order to solve this, the A/N reporting PUCCH resource is configured through each of the DCIs which the UE receive through different CORESET groups and each A/N reporting PUCCH resource is configured in the same slot, the A/N reporting PUCCH resources are subjected to time division multiplex (TDM) through different OFDM symbols in the same slot and each A/N reporting PUCCH should be able to be transmitted. In this case, a combination of PUCCH formats which may be subjected to TDM should not be limited. That is, in the Rel-15 NR standard, TDM of two PUCCHs in the same slot is permitted only in a case where both PUCCHs are short PUCCHs (e.g., PUCCH formats 0, 2) and a case where one is long PUCCH (e.g., PUCCH format 1, 3, 4) and the remaining one is short PUCCH, but even when all PUCCH resources are configured as the long PUCCHs, the PUCCH resources should be able to be subjected to TDM in the slot. As a result, since both TRPs may use the long PUCCH, both TRPs may have a higher degree of scheduling freedom.

Further, even when the contents transmitted through the PUCCH include contents other than A/N (i.e., in the case of the CSI or PUCCH transmitting the SR), if the PUCCH resource is configured through the DCI received through the CORESET group, two (or multiple) long PUCCHs should be TDMed within the same slot. In order to TDM two long PUCCHs in one slot at the symbol level, the sum of the numbers of symbols of tow long PUCCHs should be set to 14 or less, and in an environment in which a backhaul connection delay between two TRPs sending each PUCCH is large and two TRPs may not thus configured to be cooperated with each other, the maximum number of symbols per long PUCCH may be limited to a specific number (e.g., 7) or less and allocated. That is, when two DCIs received through different CORESETs (CORESET groups) allocate the long PUCCH resource to the same slot, the UE may expect that the sum of symbol numbers of two long PUCCHs is configured to be 14 or less or expect that the maximum symbol number of each long PUCCH is configured to be a specific number (e.g., 7) or less. A PUCCH transmission method of Proposal Method 1 below may be applied even to the case where two (or multiple) long PUCCHs are TDMed in the same slot.

<Proposal Method 1>

Hereinafter, a solving method of a case where multiple PUCCH(s) collide with each other the same resource region in the multiple TRP based operation will be proposed. As an example, the PUCCH may be a PUCCH for A/N feedback transmission for downlink data (e.g., PDSCH) received from multiple TRPs.

Specifically, a method for determining the priority when two PUCCH resources (e.g., OFDM symbol/RE/slot) which each TRP allocates through the DCI are overlapped (this is referred to as a collision of the PUCCH and the PUCCH) and a method for transmitting only one PUCCH and dropping the remaining PUCCH or piggybacking a PUCCH having a lower priority to a PUCCH having a higher priority or puncturing or rate matching the PUCCH having the lower priority may be considered. The UE may recognize PUCCCH(s) scheduled by DCIs received by different CORESETs (or CORESETs which belong to different CORESET groups) as PUCCH transmitted to different TRPs or PUCCH of different TRPs.

Proposal 1-1. The priority may be determined based on information each TRP which the BS configures to the UE. The information for each TRP may include ID (or index) type information. Based on a priority rule, a PUCCH resource configured by a specific TRP may take precedence over a PUCCH resource configured by another TRP. In Alts 1 to 4 below, the ID may mean the index.

Alt. 1—PDSCH-Config IE (Information Element) or PDCCH-Config IE

When the UE is configured with different PDSCH-config IE for each TRP from the BS, the UE may prioritize a PUCCH resource in which A/N of PDSCH corresponding to lower (or higher) PDSCH-config ID is transmitted. Alternatively, when the UE is configured with different PDCCH-config IE for each TRP from the BS, the UE may determine which PDCCH-config is used for receiving each DCI that configures PUCCH resources (e.g., PUCCH resource 1 and PUCCH resource 2) of each TRP and prioritize a PUCCH resource indicated by DCI corresponding to lower (or higher) PDCCH-config ID.

Alt. 2—CORESET (CS) Group (Replaceable and Applicable with CORESET Instead of CORESET Group)

When the UE is configured with a different CORESET group for each TRP from the BS, the UE may determine from which CORESET group each DCI that configures PUCCH resources (e.g., PUCCH resource 1 and PUCCH resource 2) of each TRP is received and may prioritize a PUCCH resource indicated by DCI corresponding to lower (or higher) CORESET group ID.

Alt. 3—Search Space (SS) Group (Replaceable and Applicable with SS Instead of SS Group)

When the UE is configured with a different SS group for each TRP from the BS, the UE may determine from which SS group each DCI that configures PUCCH resources (e.g., PUCCH resource 1 and PUCCH resource 2) of each TRP is received and may prioritize a PUCCH resource indicated by DCI corresponding to lower (or higher) SS group ID.

Alt. 4—TCI Group (Replaceable and Applicable with TCI Instead of TCI Group)

When the UE is configured with a different TCI group for each TRP from the BS, the UE may determine of which TCI of TCI group is used for receiving each DCI that configures PUCCH resources (e.g., PUCCH resource 1 and PUCCH resource 2) of each TRP and may prioritize a PUCCH resource indicated by DCI corresponding to lower (or higher) TCI group ID.

In Alts. 1 to 4 above, the BS may directly indicate, to the UE, which CORESET/Search space/TCI group is prioritized.

The BS may indicate/configure CORESET/Search space/TCI group to the UE. For example, if only one CORESET/Search space/TCI group of multiple CORESET/search space/TCI groups configured to the UE corresponds to TRP2 and the remaining CORESET/search space/TCI groups correspond to TRP1, the BS distinguishes and indicates one CORESET/Search space/TCI group corresponding to TRP2 to the UE to group the CORESET/Search space/TCI groups. Alternatively, the BS does not distinguish and directly indicate one CORESET/Search space/TCI group corresponding to TRP2, but the UE may determine the CORESET/Search space/TCI group by a promised rule. For example, CORESET/Search space/TCI group having a smallest (or largest) ID (/index) may be promised to correspond to TRP 2 between the BS and the UE.

In other words, the TRP and the CORESET/Search space/TCI group may be mapped based on the indication/configuration of the BS or a predefined rule, and the priority may be determined according to the methods and/or embodiments of Alts. 1 to 4 described above or the indication of the BS.

Alternatively, the priority of the PUCCH resource may be determined by a combination of Alts. 1 to 4 above. That is, the priority of the PUCCH resource may be determined by one of Alts. 1 to 4 described above and when the PUCCH resources have the same priority, the priority may be determined through a method other than previously used methods. For example, the priority may be first determined by the CORESET group ID (or CORESET ID) and when the priority is the same, the priority may be determined through Search Space group ID (or Search Space ID).

In the proposed methods of Alts. 1 to 4 described above, a value having lower ID/index is prioritized, but on the contrary, the priority may be determined by prioritizing a higher value (i.e., prioritizing a PUCCH resource corresponding to a parameter (e.g., PDSCH/PDCCH-config ID, CORESET group ID, Search space group ID, etc.) having lower ID/index for each of Alts 1 to 4 may be modified to prioritizing a PUCCH resource corresponding to a parameter (e.g.: PDSCH/PDCCH-config ID, CORESET group ID, Search space group ID, etc.) having higher ID/index).

Proposal 1-2. The priority rule may be based on with which C-RNTI (or UE-RNTI) the DCI transmitted by each TRP is CRC-masked/scrambled.

For example, the UE may determine with which C-RNTI (or UE-RNTI) each DCI configuring PUCCH resource 1 and PUCCH resource 2 is CRC-masked (or with which C-RNTI (or UE-RNTI) is scrambled) and prioritize a PUCCH resource indicated by DCI corresponding a lower (or higher) C-RNTI value.

For reception of NCJT data, the UE may be configured with two C-RNTIs. As an example, it may be promised that C-RNTI1 is used for DCI transmission and data transmission of TRP1 (i.e., used for the purpose of CRC masking or scrambling) and C-RNTI2 is used for DCI transmission and data transmission of TRP2.

Alternatively, the PUCCH is scrambled by using the C-RNTI according to the PUCCH format (i.e., in the case of PUCCH formats 2, 3, and 4), and a different value may be used according to which TRP the used C-RNTI is a PUCCH transmitted to. For example, when PUCCH resource 1 is scrambled by using the C-RNTI1 and PUCCH resource 2 is scrambled by using the C-RNTI2, a PUCCH resource using low (or high)C-RNTI may be prioritized.

Proposal 1-3. A priority rule according to the PUCCH format may be considered.

Table 6 shows an example of the PUCCH format in the NR system. In the NR system, the PUCCH format may be divided into a short PUCCH and a long PUCCH by a symbol duration, a payload size, and multiplexing. The short PUCCH includes i) format 0 supporting multiplexing and for UCI of a maximum of 2 bit size and ii) format 2 not supporting multiplexing and for UCI which exceeds 2 bits. The long PUCCH includes i) format 1 supporting multiplexing and for UCI of a maximum of 2 bit size, ii) format 3 not supporting multiplexing and for UCI which exceeds 2 bits, and iii) format 4 supporting and for UCI which exceeds 2 bits.

TABLE 6

| Format | PUCCH length in OFDM symbols | Number of bits | [Usage] | Etc. |
|---|---|---|---|---|
| 0 | 1-2 | ≤2 | HARQ, SR | Sequence selection |
| 1 | 4-14 | ≤2 | HARQ, SR | Sequence modulation (BPSK, QPSK) |
| 2 | 1-2 | >2 | HARQ, CSI | CP-OFDM |
| 3 | 4-14 | >2 | HARQ, CSI | DFT-s-OFDM (no UE multiplexing) |
| 4 | 4-14 | >2 | HARQ, CSI | DFT-s-OFDM (Pre DFT OCC) |

Alt. 1—For a priority rule, when only one of PUCCH resources 1 and 2 is configured as the long PUCCH, the long PUCCH having a large transmission capacity may be prioritized. That is, PUCCH formats 1, 3, and 4 may prioritize formats 0 and 2.

Alt. 2—For a priority rule, a PUCCH resource having a larger UCI payload which is transmittable (or should be actually transmitted) may be prioritized among PUCCH resources 1 and 2. That is, PUCCH formats 2, 3, and 4 may prioritize formats 0 and 1. The PUCCH resource having the larger UCI payload which should be actually transmitted may be prioritized among PUCCH formats 2, 3, and 4. The PUCCH resource having the larger UCI payload which should be actually transmitted may be prioritized among PUCCH formats 0 and 1.

Alt. 3—A resource capable of multiplexing (e.g., code domain multiplexing) may be prioritized among PUCCH resources 1 and 2 according to the priority rule. That is, PUCCH formats 0, 1, and 4 may take precedence over formats 2 and 3.

Alt. 4—A resource selection priority may be determined through a combination of the proposals (e.g., Alts. 1 to 3) of Proposal 1-3. For example, when the priority is not determined according to one priority rule of Alts. 1 to 3, the priority may be determined by using one priority rule of the remaining methods other than the corresponding method. As a specific example, first, the long PUCCH is prioritized and when both PUCCHs are the long PUCCHs, the PUCCH resource having the larger UCI payload size which is transmittable may be prioritized. When the transmittable UCI payloads are equal, the priority may be determined according to multiplexing.

Proposal 1-4. The priority may be determined based on PUCCH resource ID (or index)/resource set ID (or index).

For example, for a priority rule, a PUCCH resource having a smaller (or larger) PUCCH resource ID (or index)/resource set ID (or index) may be prioritized.

As a specific example, when PUCCHs transmitted to different TRPs collide with each other, the UE may prioritize and report a PUCCH resource having lower PUCCH resource set ID (or index) (the remaining PUCCH resource may be dropped or piggybacked to a PUCCH resource having a higher priority). Alternatively, the PUCCH resource having lower PUCCH resource ID (or index) may be prioritized and reported. Alternatively, after the priority is determined with the PUCCH resource set ID (or index), the priority may be determined with the PUCCH resource ID (or index) for the same priority.

Proposal 1-5. The priority may be determined based on a downlink assignment index (DAI) value. For example, a largest DAI value of a codebook which is scheduled to be transmitted PUCCH resource 1 and a largest DAI value of a codebook which is scheduled to be transmitted to PUCCH resource 2 are compared with each other, a PUCCH resource corresponding to a larger DAI value among both DAI values may be prioritized and transmitted.

Proposal 1-6. When PUCCHs of different TRPs collide/overlap, the priority may be determined based on a size of an A/N codebook to be transmitted through the PUCCH. For example, a PUCCH having a larger size of the A/N codebook may be prioritized. As an example, the UE may prioritize and report a PUCCH having a larger A/N amount to be reported by reporting an A/N PUCCH having a larger codebook size and dropping the remaining PUCCH.

In the case of a dynamic codebook, the A/N codebook size is determined by a DAI value (counter-DAI or total-DAI), TB-level/CBG-level A/N, codeword number, spatial bundling on/off, etc. In the case of a semi-static codebook, the A/N codebook size is determined by the number of K1 value candidates, the TB-level/CBG-level A/N, the codeword number, the spatial bundling on/off, etc. In respect to the number of K1 value candidates, the TB-level/CBG-level A/N, the codeword number, the spatial bundling on/off, etc., when the same value is commonly applied to multiple TRPs, the codebook size may be determined through the DAI value.

Alternatively, together with the method for determining the priority based on the size of the A/N codebook of Proposal 1-6 above, the proposal methods (e.g., Proposal 1-1 to Proposal 1-5) may also be used together. For example, the priority is first determined based on the size of the A/N codebook, and when the same priority is determined by the same size, a PUCCH (e.g., a PUCCH for data scheduled from CORESET corresponding to lower CORESET group ID or lower CORESET ID) of a specific TRP may be prioritized.

Proposal 1-7. The priority may be determined according to contents included in the PUCCH. For example, even when an A/N reporting PUCCH resource allocated by one TRP and an SR/CSI reporting PUCCH resource allocated by the other one TRP collide with each other, the A/N reporting PUCCH resource may be the priority and the SR/CSI reporting PUCCH resource may be dropped or punctured (or rate-matched). The reason is that A/N information for data may be more important than control information such as SR/CSI.

More elaborately, the priority may be changed according to whether CSI reporting is periodic/semi-persistent/aperiodic. For example, in the case of the aperiodic CSI, since the BS triggers the CSI reporting due to an immediate need, a CSI PUCCH resource may be prioritized and reported over the A/N and the A/N PUCCH resource may be dropped or punctured.

Based on the priority determined according to the methods and/or examples of Proposals 1-1 to 1-7 of Proposal Method 1 described above, a PUCCH having a lower priority may be dropped or the PUCCH having the lower priority may be piggybacked to a PUCCH having a higher priority or the PUCCH having the lower priority may be punctured or rate-matched, and transmitted.

When one PUCCH is selected based on a priority determining method of methods (e.g., Proposals 1-1/1-2/1-3/1-4/1-5/1-6/1-7, etc.) of Proposal Method 1 (e.g., PUCCH resource 1), the UE may report A/N information to be transmitted to a PUCCH (e.g., PUCCH resource 2) to be dropped (i.e., having a lower priority) through a selected PUCCH resource (e.g., PUCCH resource 1) selected together with A/N information to be transmitted to the selected PUCCH resource (e.g., PUCCH resource 1). In other words, the A/N information of PUCCH resource 2 may be piggybacked to PUCCH resource 1 and transmitted together with the A/N information of PUCCH resource 1.

When the A/N information is piggybacked, an order of encoding the A/N information needs to be defined. For example, arranging A/N information to be originally transmitted through PUCCH resource 1 in most significant bit (MSB) and arranging the remaining A/N information in least significant bit (LSB) may be promised between the BS and the UE (or the A/N information may be arranged conversely). Alternatively, it may be promised that A/N of data scheduled by DCI received by using lower CORESET group ID is arranged in the MSB and the remaining A/N information is arranged in the LSB (or the A/N information may be arranged conversely).

Similarly, even when the PUCCH reporting the CSI and the PUCCH reporting the A/N collide with each other, contents loaded on one PUCCH may be piggybacked to the other PUCCH, and the BS may determine whether to piggyback the contents and inform the UE of whether to piggyback the contents.

Further, the BS may indicate, to the UE, whether to perform a piggyback operation, and when the piggyback operation is disabled, the UE may report only the A/N to be transmitted to the selected PUCCH resource and drop the PUCCH having the lower priority. Enabling/disabling the piggyback operation may be configured through RRC signaling or MAC-CE signaling.

Alternatively, the priority of the PUCCH may be determined according to the methods (e.g., Proposals 1-1/1-2/1-3/1-4/1-5/1-6/1-7, etc.) of Proposal Method 1 described above, and the UE may puncture and transmit a resource (e.g., RE/symbol, etc.) of the PUCCH resource having the lower priority which overlaps with the PUCCH resource having the higher priority, and transmit the PUCCH resource having the higher priority as it is.

Since the PUCCH having the lower priority is punctured, a reception success rate is low. When the BS decodes the PUCCH, if the BS does not know a fact that the PUCCH is punctured, the BS decodes the punctured resource by assuming that the punctured resource is a normal PUCCH resource, performance deterioration is large. Accordingly, the UE may report, the BS, the fact that the corresponding PUCCH is punctured and a location of the punctured resource (e.g., RE).

Further, it is possible to perform the rate matching instead of the puncturing. That is, a resource (e.g., RE) of the PUCCH resource having the lower priority which overlaps with the PUCCH resource having the higher priority may be rate-matched and transmitted, and the PUCCH resource having the higher priority may be transmitted as it is. The UE may report, the BS, the fact that the corresponding PUCCH is rate-matched and the location of the rate-matched resource (e.g., RE).

The BS may configure, to the UE, the operation of the UE to be enabled/disabled through the RRC signaling. Specifically, the BS may indicate, to the UE, whether to select one of two PUCCH resources transmitted in the same slot to perform A/N feedback (i.e., whether to drop one PUCCH) or perform A/N piggyback, or whether to perform both PUCCH resources by performing puncturing/rate matching.

Proposal Method 1 above is a solving method when two PUCCH resources delivered to each TRP are scheduled in the same slot, and two PUCCH resources (e.g., RE/symbol, etc.) even partially overlap. When two PUCCH resources do not overlap, the UE may transmit both PUCCHs.

The proposal method for the PUCCH/PUCCH transmitted to different TRPs may be applied equally even to PUCCH/PUCCH transmitted to different panels which belong to the same TRP.

<Proposal Method 2>

Proposal Method 1 (e.g., Proposals 1-1 to 1-7) above is described based on two PUCCHs containing the A/N information, but by extending this, Proposal Method 1 above may be applied even between the PUCCH transmitting the A/N and the PUCCH transmitting the SR/CSI, and applied even between the PUCCH and the PUSCH. That, is, by extending Proposal Method 1 (e.g., Proposals 1-1 to 1-7) described above, a method for determining the priority when the PUCCCH allocated by one TRP and the PUSCH allocated by the other one TRP overlap/collide in the same resource region (e.g., symbol/RE/slot) (this is referred to as a collision of the PUCCH and the PUSCH), and an operation method based thereon are proposed. As an example, the PUCCH may be a PUCCH for A/N feedback transmission for downlink data (e.g., PDSCH) received from multiple TRPs. The UE may recognize PUSCH (or PUCCH) scheduled by DCI received by different CORESETs (or CORESETs which belong to different CORESET groups) as PUSCH (or PUCCH) transmitted to different TRPs or PUSCH (or PUCCH) of different TRPs.

According to contents transmitted to the PUSCH when the collision of the PUSCH and the PUCCH transmitted to different TRPs occurs, three following cases (cases 1 to 3) may occur. In three following cases, for convenience of description, it is assumed that TRP1 transmits the PUSCH and TRP2 transmits the PUCCH, but an opposite configuration is also possible, and the assumption does not limit the technical scope of the present disclosure.

Case 1. Case where PUSCH (e.g., UL data) for TRP1 and PUCCH for TRP2 collide

Case 2. Case where PUSCH (e.g., UCI (e.g., semi-persistence (SP)/aperiodic (A) CSI)) for TRP1 and PUCCH for TRP2 collide Case 3. Case where PUSCH (e.g., UL data+UCI (e.g., semi-persistence (SP)/aperiodic (A) CSI or piggyback UCI)) for TRP1 and PUCCH for TRP2 collide When the information transmitted to the PUCCH includes the A/N, the priority may be determined by the following scheme.

In the case of Case 1, the PUCCH may take precedence over the PUSCH. For example, the PUSCH may be dropped and the PUCCH A/N may be reported. When the PUCCH A/N is dropped, downlink (DL) data is retransmitted and resource efficiency is lowered, and as a result, it is effective to report the A/N.

In the case of Case 2, the PUCCH may take precedence over the PUSCH. For example, the PUSCH may be dropped and the PUCCH A/N may be reported. When the PUCCH A/N is dropped, the downlink data is retransmitted and the resource efficiency is lowered, and as a result, it is effective to report the A/N.

In the case of Case 3, the PUSCH may take precedence over the PUCCH. For example, when the piggybacked UCI is the A/N, the PUSCH may be transmitted and the PUCCH may be dropped. In this case, since both the A/N and the data are transmitted to the PUSCH, the PUSCH may be higher than the PUCCH reporting only A/N in terms of the resource efficiency. When there is no A/N information in the PUSCH, the PUCCH A/N may be prioritized and transmitted. Alternatively, in Case 3, since both the data and the UCI are transmitted to the PUSCH, it may be preferable to prioritize PUSCH transmission over transmission of the PUCCH reporting only the A/N.

When the information transmitted to the PUCCH does not include the A/N (i.e., when the information includes only periodic/semi-persistent CSI (hereinafter, P CSI/SP CSI) or a scheduling request (SR)), the priority may be determined by the following scheme.

In the case of Case 1, the PUSCH may take precedence over the PUCCH. For example, the PUSCH may be transmitted and the PUCCH may be dropped. When the PUSCH is dropped, uplink (UL) data is retransmitted and the resource efficiency is lowered, and as a result, it is effective to report the PUSCH.

In the case of Case 2, the PUSCH may take precedence over the PUCCH. For example, the PUSCH may be transmitted and the PUCCH may be dropped. Since the aperiodic CSI (hereinafter, referred to as AP CSI) is characterized to be indicated to be reported only once when there is a request according to a need of the BS, the AP CSI may be may be more important than SP/P CS reported several times with a specific period. Accordingly, it may be preferable to prioritize the PUSCH transmission reporting the AP CSI. Further, since the SP CSI is more important the P CSI which is continuously periodically reported, it may be preferable to prioritize the PUSCH transmission reporting the SP CSI.

In the case of Case 3, the PUSCH may take precedence over the PUCCH. For example, when the UCI transmitted to the PUSCH is the AP/SP CSI or the UCI piggybacked to the PUSCH includes the A/N, the PUSCH may be prioritized and transmitted. Since the AP/SP CSI or the A/N is more important information than the P/SP CSI and the SR transmitted to the PUCCH, such an operation may be preferable. Even when the PUSCH does not include the AP/SP CSI or the A/N, the PUSCH may be prioritized and transmitted. When the PUSCH is dropped, the UL data is retransmitted and the resource efficiency is lowered, and as a result, it is effective to report the PUSCH.

Alternatively, regardless of whether a container to which the UCI information is transmitted is the PUSCH or the PUCCH, when there are the same type of UCI contents in both containers, the priority may be determined by using the proposed method. For example, the A/N for the PDSCH of TRP1 is transmitted to the PUCCH and the A/N for the PDSCH of TRP2 is transmitted to the PUSCH, and both resources collide/overlap (e.g., when some/all resource regions/REs overlap), it may be reported that A/N of a specific TRP has the priority over the A/N of the other TRP by the proposed method (e.g., the solving method according to Case 1/2/3 of Proposal Method 2). Alternatively, according to the codebook size of the A/N, A/N having a larger codebook size may be prioritized and reported. That is, when the PUSCH and the PUCCH transmitted to different TRPs collide, according to the contents transmitted to the PUSCH (e.g., according to whether the contents are the data, the A/N, or the SR), the PUSCH may be reported and the PUCCH may be dropped or the PUSCH may be dropped and the PUCCH may be reported.

Proposal Method 2 described above is described based on an example of dropping a channel having the lower priority among the PUSCH or the PUCCH, but the channel having the lower priority may be punctured (or rate-matched) with respect to the overlapped resource (e.g., OFDM symbol/RE) or the channel having the lower priority may be piggybacked to the channel having the higher priority, and transmitted.

For example, by applying a piggyback scheme, when the PUCCH and the PUSCH collide (e.g., when the same symbol or the same RE is allocated), information (e.g., CSI, A/N, or SR) to be transmitted to the PUCCH may be piggybacked to the PUSCH and transmitted together the uplink (UL) data through the PUSCH.

When a backhaul delay between two TRPs is small, the TRP receiving the PUSCH may deliver the piggybacked information (e.g., CSI, A/N, or SR) to the other TRP. When the backhaul delay is large, such an operation may be unsuitable, and as a result, it may be preferable to drop or puncture the PUSCH without piggyback. Accordingly, the BS may inform the UE of enabling/disabling of the piggyback through the RRC/MAC-CE signaling or DCI according to the backhaul delay.

In the above operation, the BS may indicate, to the UE, whether to puncture or drop the PUSCH (or PUCCH). Alternatively which operation is to be performed may be determined according to a determined rule. For example, when symbols of a specific ratio/a specific symbol number or less among all PUSCH (or CSI reporting PUCCH) symbols overlap, the corresponding PUSCH symbol may be punctured and if not (i.e., when symbols more than the specific ratio/specific symbol number overlap), the corresponding PUSCH symbol may be dropped. As an example, when the number of overlapped PUSCH symbols is 2 or less, the PUSCH symbol may be punctured and if not, the PUSCH symbol may be dropped. Alternatively, when all PUSCHs are 10 symbols or more and the overlapped symbols are 2 symbols or less, the PUSCH symbol may be dropped.

The proposal for the PUSCH/PUCCH transmitted to different TRPs may be applied equally even to PUSCH/PUCCH transmitted to different panels which belong to the same TRP.

Meanwhile, the UE may determine whether two PUCCH resources which collide or the PUCCH resource and the PUSCH resource are allocated from the same TRP or different TRPs. For example, the UE may determine that the resources are allocated from the same TRP when DCI indicating allocation of two resources is received through the same CORESET (or CORESET group) and determine that the resources are allocated from different TRPs when the DCI is received through different CORESETs (or CORESET groups).

The proposal methods (e.g., Proposal Method 1, Proposal Method 2, etc.) are schemes of determining the priority when two PUCCHs or the PUCCH and the PUSCH scheduled by the DCI received by different CORESETs (or CORESET groups) collide. A case where two PUCCHs or the PUCCH and the PUSCH scheduled by the DCI received by the same CORESET (or CORESET group) collide is regarded as a case where two resources transmitted to one TRP collide and the legacy determination method may be followed (a case where the CORESET group is not configured to the UE may be regarded as a case where all configured CORESETs belong to the same group).

In addition to the scheme in which the priority determination scheme varies depending on the CORESET (or CORESET group), whether to apply the legacy priority determination scheme or the proposal scheme may be determined according to a spatial relation reference signal (RS) of two PUCCHs which collide or the PUCCH and the PUSCH which collide is the same. That is, if the spatial relation reference signal (RS) is the same, it is regarded that two resources transmitted to one TRP collide to follow the legacy determination scheme. When the spatial relation RS is different, it is regarded that two resources transmitted to different TRPs collide to follow the proposal methods (e.g., Proposal Method 1, Proposal Method 2, etc.).

In the Rel-16 NR system, a method in which the BS separately signals, to the UE, PUCCH resources available for each TRP is discussed. For example, if the UE may distinguish the TRP by using the CORESET group ID (or CORESET ID), all PUCCH resources are divided and configured into multiple PUCCH resource groups, and the CORESET group ID and the PUCCH resource group are mapped 1:1 to determine the PUCCH resources available for each TRP.

The UE which is indicated to transmit PUCCH resources (e.g., PUCCH resources indicated/configured by the same TRP) which belong to the same PUCCH resource group in one slot may perform resource selection/UCI piggyback/dropping/multiplexing of transmitted PUCCH in the same scheme as the legacy Rel-15 NR system.

If the UE is indicated to transmit PUCCH resources (e.g., PUCCH resources indicated/configured by different TRPs)

which belong to different PUCCH resource groups in one slot (e.g., PUSCH resources of PUCCHs to be transmitted to multiple TRPs (or configured for each PUCCH) are indicated/configured to be transmitted in one slot), the UE may assume that two PUCCHs are transmitted to different TRPs and follow the proposal methods (e.g., Proposal Method 1, Proposal Method 2, etc.). That is, when time/frequency resources of two PUCCHs overlap, one PUCCH may be dropped based on the proposal methods (e.g., Proposal Method 1, Proposal Method 2, etc.) (if the piggyback is enabled through separate signaling (e.g., RRC signaling/PUCCH-config/PUCCH-ConfigCommon), the UCI may be piggybacked to one PUCCH, and transmitted even in this case), and when the time/frequency resources of two PUCCHs do not overlap, two PUCCHs may be TDMed and transmitted at the symbol level.

Meanwhile, in Rel-16 eURLLC, a sub-slot concept is introduced so as to TDM and transmit multiple PUCCHs in the same slot (e.g., N OFDM symbols are constituted by one sub-slot (N=2, 3, . . . )). For example, when the BS is configured to transmit two PUCCHs in different sub-slots constituting one slot, the UE may transmit two PUCCHs in corresponding sub-slots, respectively.

In the present disclosure, when the UE is indicated to transmit two or more PUCCHs (or PUCCH and PUSCH) in the same slot, a UE operation is primarily described, but when the sub-slot (e.g., N OFDM symbols are constituted by one sub-slot (N=2, 3, . . . ) is introduced, the above-described proposal methods (e.g., Proposal Method 1/Proposal Method 2, etc.) may be applied even to the operation in the same sub-slot instead of the same slot. However, in this case, symbol-level TDM of PUCCHs of multiple TRPs (e.g., two TRPs) configured in the same sub-slot is not permitted, and it is regarded that a collision of the PUCCHs of multiple TRPs (e.g., two TRPs) configured in the same sub-slot occurs to drop the PUCCHs or apply the piggyback, the rate-matching, or the puncturing according to the proposal method (e.g., Proposal Method 1/Proposal Method 2, etc.).

<Proposal Method 3>

Proposed is a method for encoding the A/N codebook in order to transmit A/N feedback for TRPs connected through ideal (or low-delay) backhaul (BH) through one uplink channel (e.g., PUCCH).

Table 7 shows an example of NCJT and A/N feedback of two TRPs (e.g., TRP1 and TRP2) connected through ideal BH. FIG. 7 is just for convenience of the description and does not limit the technical scope of the present disclosure.

configured by the other TRP, and configure one PUCCH resource for the A/N feedback. A/N feedback information reported to one TRP (one of TRP1 or TRP2) through one PUCCH may be shared by the other TRP through the ideal BH. That is, since the ideal BH is assumed, even though the TRP is different, one TRP may perform dynamic codebook generation and A/N feedback may be performed by the same scheme as scheduling data through the DCI and performing the A/N feedback.

When a maximum number of codewords (CWs) of two TRPs (TRP1 and TRP2) are configured to be different from each other, enabling/disabling of code block group (CBG) level A/N is different, or the number of CBGs used in the CBG level A/N is different, A/N payload sizes of two TRPs may be different. For example, even though the maximum CW numbers of both TRPs are configured to 1, when CBG level A/N is enabled with N CBGs, A/N of PDSCH transmitted by TRP1 is N bits and A/N of PDSCH transmitted by TRP2 is 1 bit. In the example of Table 7, the UE may generate N bit, 1 bit, N bit, and 1 bit A/Ns for PDSCHs 1-1, 1-2, 2-1, and 2-2, respectively and encode the generated N bit, 1 bit, N bit, and 1 bit A/Ns with one codebook.

As such, when the A/N payload sizes of two TRPs are different, if the UE is unsuccessful in DCI decoding, a problem in that of which TRP the A/N codebook should be generated based on the A/N payload size is ambiguous may occur. Of course, in order to prevent such a problem, the UE may not expect that the BS configures the maximum CW numbers of two TRPs to be different, enabling/disabling of the CBG level A/N to be different, or the number of CBGs used in the CBG level A/N to be different.

TABLE 8

| Slot 1 | Slot 2 | Slot 3 | Slot 4 | Slot 5 | Slot 6 | Slot 7 | Slot 8 | Slot 9 | Slot 10 |
|---|---|---|---|---|---|---|---|---|---|
| DAI = 1 From TRP 1 | | | PDSCH 1-1 | | DAI = 2 From TRP 1 | DAI = 3 From TRP 2 | | PDSCH 2-1 PDSCH 2-2 | A/N |

Table 8 is an example showing an ambiguity problem of A/N codebook generation when DCI decoding is unsuccessful in relation to the NCJT and the A/N feedback of two TRPs connected through the ideal (or low-delay) BH. FIG. 8 is just for convenience of the description and does not limit the technical scope of the present disclosure.

In Table 8, a PDCCH search space of TRP1 is configured at a period of 5 slots starting from slot 1 and a PDCCH search space of TRP2 is configured at a period of 5 slots starting from slot 2. In slot 1, TRP1 transmits the DCI and schedules PDSCH 1-1, and schedules A/N therefor in slot 10. In slot 2, TRP2 does not transmit the DCI. In slot 6, TRP1 transmits the DCI and schedules PDSCH 2-1, and schedules A/N therefor in slot 10. In slot 7, TRP2 transmits the DCI and schedules PDSCH 2-2, and schedules A/N therefor in slot 10.

TABLE 7

| Slot 1 | Slot 2 | Slot 3 | Slot 4 | Slot 5 | Slot 6 | Slot 7 | Slot 8 | Slot 9 | Slot 10 |
|---|---|---|---|---|---|---|---|---|---|
| DAI = 1 From TRP 1 | DAI = 2 From TRP 2 | | PDSCH 1-1 PDSCH 1-2 | | DAI = 3 From TRP 1 | DAI = 4 From TRP 2 | | PDSCH 2-1 PDSCH 2-2 | A/N |

In Table 7, by assuming a case where the backhaul delay between the TRPs is small, each TRP may configure the DAI value to sequentially increase by referring to a DAI value If the UE is unsuccessful to DCI decoding in slot 1 and successful to DCI decoding in slots 6 and 7, the UE may recognize that the DCI is transmitted by the BS in slot 1 or 2 but decoding is unsuccessful, by checking the DAI. However, since the A/N payload size varies depending on whether DCI of which decoding is unsuccessful is transmitted in slot 1 or 2, a problem in that on which payload size the codebook should be generated based is ambiguous may occur.

In order to solve the above-described problem, the UE may generate the codebook based on a larger payload size value (i.e., a larger bit number) for the DCI of which decoding is unsuccessful. That is, in the example of Table 8, the UE may generate N bit, N bit, and 1 bit A/Ns for PDSCHs 1-1, 2-1, and 2-2, respectively and encode the generated N bit, N bit, and 1 bit A/Ns with one codebook.

Alternatively, when the A/N payload sizes of two TRPs are different, all codebooks may be unconditionally generated based on the large payload size. That is, in the example of Table 8, the UE may generate N bit, N bit, and N bit A/Ns for PDSCHs 1-1, 2-1, and 2-2, respectively and encode the generated N bit, N bit, and N bit A/Ns with one codebook. In the example of Table 7, the UE may generate N bit, N bit, N bit, and N bit A/Ns for PDSCHs 1-1, 1-2, 2-1, and 2-2, respectively and encode the generated N bit, N bit N bit, and N bit A/Ns with one codebook.

Alternatively, the DAI values of two TRPs are paired and the same DAI value may be configured for each pair, and A/N bit corresponding to one DAI value may be determined as N+1 bits acquired by adding A/N N bits of TRP1 and A/N 1 bit of TRP2. In this case, Table 7 may be changed like Table 9. The UE may generate A/Ns for PDSCHs 1-1 and 1-2 as N+1 bits and generate A/Ns for PDSCHs 2-1 and 2-2 as N+1 bits, and encode the generated bits with one codebook.

TABLE 9

| Slot 1 | Slot 2 | Slot 3 | Slot 4 | Slot 5 | Slot 6 | Slot 7 | Slot 8 | Slot 9 | Slot 10 |
|---|---|---|---|---|---|---|---|---|---|
| DAI = 1 From TRP 1 | DAI = 1 From TRP 2 | | PDSCH 1-1 PDSCH 1-2 | | DAI = 2 From TRP 1 | DAI = 2 From TRP 2 | | PDSCH 2-1 PDSCH 2-2 | A/N |

Table 9 shows an example of configuring the DAI values as a pair and the A/N feedback in NCJT data transmission of two TRPs connected through the ideal (or low-delay) BH. When TRP2 does not transmit the DCI in slot 2 in Table 9, Table 9 may be changed like Table 10.

Table 10 shows an example of A/N feedback when the DAI values are configured as a pair in the NCJT data transmission of two TRPs connected through the ideal (or low-delay) BH, but DCI of one TRP is not transmitted. In Table 10, since A/N bit for DAI=1 is 1+N bits even though the UE is unsuccessful in DCI decoding in slot 1, regardless of whether decoding the DCI of TRP1 is unsuccessful in slot 1 or decoding the DCI of TRP2 is unsuccessful in slot 2, the UE may generate A/N as N+1 bits for DAI=1 and generate A/N as N+1 bits for DAI=2.

TABLE 10

| Slot 1 | Slot 2 | Slot 3 | Slot 4 | Slot 5 | Slot 6 | Slot 7 | Slot 8 | Slot 9 | Slot 10 |
|---|---|---|---|---|---|---|---|---|---|
| DAI = 1 From TRP 1 | | | PDSCH 1-1 | | DAI = 2 From TRP 1 | DAI = 2 From TRP 2 | | PDSCH 2-1 PDSCH 2-2 | A/N |

Through the above-described proposal method, the UE may encode HARQ-ACK information for multiple TRPs with one A/N codebook and feed back the HARQ-ACK information to the BS. In particular, even though the UE fails to receive some of multiple DCIs transmitted from multiple TRPs or fails to decode some DCIs, encoding some DCIs with one A/N codebook may be possible.

<Proposal Method 4>

Table 11 shows some contents of Section 9.1.3.1 of the TS 38.213 document of the NR standard.

TABLE 11

(Section 9.1.3.1 of 38.213 document)
A value of the counter downlink assignment indicator (DAI) field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion, first in ascending order of serving cell index and then in ascending order of PDCCH monitoring occasion index m Referring to the Rel-15 NR standard of Table 11, when a dynamic A/N codebook is configured, the UE may construct the codebook according to the DAI value transmitted through the DCI. In this case, the DAI value increases in ascending order of a PDCCH monitoring occasion index and when DAI values for multiple serving cells are simultaneously transmitted in the same PDCCH monitoring occasion, the DCI value increases in ascending order of a serving cell index.

However, when dynamic A/N codebooks between multiple TRPs performing multiple DCI based multiple TRP transmission are configured to be jointly configured, if two TRPs simultaneously transmit the DAI value in the same PDCCH monitoring occasion, the DAI increase scheme of the ReL-15 NR standard may cause the following problem.

From the viewpoint of the UE, two TRPs (e.g., TRP1 and TRP2) may be distinguished into different CORESETs in one ServingCellConfig in the RRC configuration. That is, the UE may distinguish DCI/PDSCH of TRP1 and DCI/PDSCH of TRP2 through the CORESET group index configured in the CORESET. Accordingly, DAI values transmitted by two TRPs may not be distinguished in terms of the PDCCH monitoring occasion and the serving cell index. Consequently, when the above-described Rel-15 standard operation is applied as it is, the DAI values transmitted by two TRPs may be equal to each other.

For example, it is assumed that two PDCCH monitoring occasions are configured and in a first PDCCH monitoring occasion, TRP1 transmits DAI=1. If TRP1 and TRP2 simultaneously transmit the DAI in a second PDCCH monitoring occasion, DAIs transmitted by TRP1 an TRP2 are not (2 and 3) but (3 and 3), respectively, and as a result, the case of DAI=2 may be missing. As a result, the UE assumes that the DCI for DAI=2 is missing and processes A/N for DAI=2 as NACK and encodes the processed A/N to the codebook, and there may be a problem in that a UE operation regarding how to generate the codebook is not defined for DAI=3 received twice.

In order to solve the problem, the following scheme may be considered. As described above, when the UE receives DCIs with different CORESETs (or CORESETs which belong to different CORESET groups), the UE may recognize the received DCIs as DCIs received from different TRPs.

Proposal 4-1. It is considered that a method for ignoring, by the UE, the corresponding DCIs when receiving the DCIs from different TRPs in the same PDCCH monitoring occasion. That is, it is possible for the BS to configure PDCCH monitoring occasions of different TRPs to be equal to each other, but the UE does not expect that multiple TRPs simultaneously transmit the DCIs in the same PDCCH monitoring occasion. Through this, the above-described problem may occur.

Alternatively, the UE may not expect that the BS configures the PDCCH monitoring occasions of different TRPs to be equal to each other. That is, the BS may always configure the PDCCH monitoring occasions of different TRPs to be different, and as a result, the above-described problem may not occur.

Proposal 4-2. By modifying the DAI increase scheme of the Rel-15, the DAI value may be configured by considering a TRP index (or ID) when TRPs are different. The TRP index means an index through which the UE may distinguish the TRP. For example, the UE may distinguish the DCI/PDSCH of TRP1 and the DCI/PDSCH of TRP2 through a CORESET group index configured in the CORESET, and in this case, the TRP index may be (correspond to) the CORESET group index (or ID). For example, the DAI value may increase in ascending order of the TRP index (or CORESET group index).

In other words, the DAI value may be configured based on the TRP index, the PDCCH monitoring occasion order, and the serving cell index. For example, the DAI value may increase in ascending order of the PDCCH monitoring occasion, when DAI values for multiple serving cells are simultaneously transmitted in the same PDCCH monitoring occasion, the DAI values may increase in ascending order of the serving cell index, and when DAI values for multiple TRPs are simultaneously transmitted in the same PDCCH monitoring occasion and the same serving cell, the DAI values may increase in ascending order of the TRP index (or CORESET group index). Consequently, when the proposal is described to correspond to contents of Table 11, the proposal may be described as 'A value of the counter downlink assignment indicator (DAI) field in DCI format 1_0 or DCI format 1_1 denotes the accumulative number of {serving cell, PDCCH monitoring occasion}-pair(s) in which PDSCH reception(s) or SPS PDSCH release associated with DCI format 1_0 or DCI format 1_1 is present, up to the current serving cell and current PDCCH monitoring occasion, first in ascending order of TRP index (or CORESET group index) and then in ascending order of serving cell index and then in ascending order of PDCCH monitoring occasion index m'.

Proposal 4-3. When the UE receives the same DAI value from two different TRPs defined in one ServingCellConfig in the same PDCCH monitoring occasion, it may be assumed that the UE receives 'DAI value −1' from one TRP. For example, as described above, it may be assumed that the UE receiving DAI (3, 3) from TRP (1, 2) ignores DAI (3, 3) and receives DAI (2, 3). The TRP which assumes a 'DAI value −1' value may be promised as a TRP having a low TRP index or a DAI value of a DCI received from CORESET having a low CORESET group index may be assumed as 'DAI value −1'.

Likewise, when receiving the same DAI value from M TRPs in the same PDCCH monitoring occasion, it may be assumed that the UE receives DAI value-(M−1), DAI value-(M−2), . . . , DAI value-(0) from each TRP. DAI value-(M−1), DAI value-(M−2), . . . , DAI value-(0) may be mapped in an order in which the TRP index is low or mapped and determined in an order in which the CORESET group index of CORESET receiving the DCI is low.

Even though multiple TRPs which operate based on multiple DCIs simultaneously transmit the DAI values in the same PDCCH monitoring occasion through the above-described proposal method (e.g., Proposal 4-1/4-2/4-3, etc.), the dynamic A/N codebook may be jointly configured and fed back without omission of the DAI value.

The proposal methods (e.g., Proposal 1/2/3/4, etc.) are described based on multiple TRPs, but this may be equally applied even to transmission through multiple panels.

Figure 10:
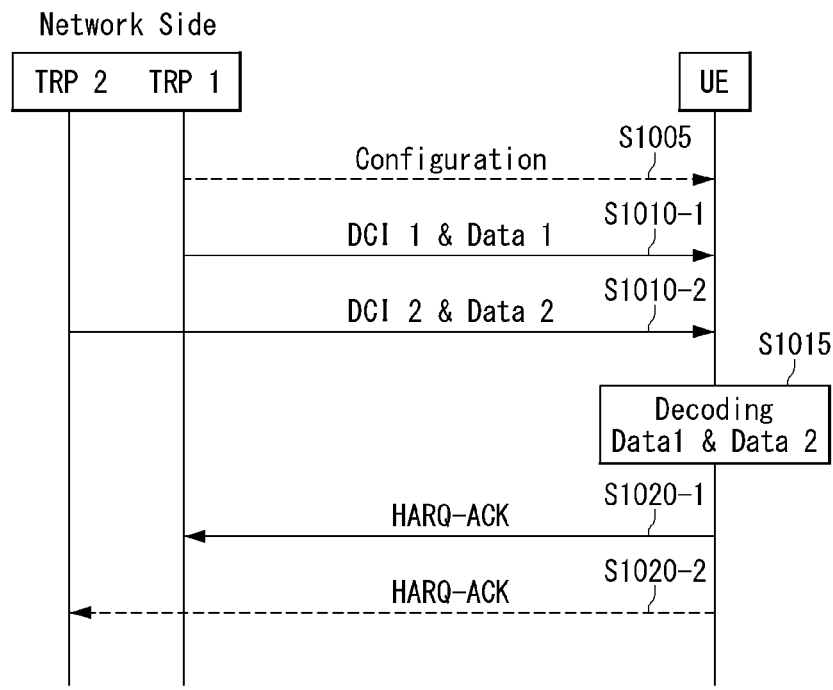
FIG. 10 illustrates another example of a signaling procedure of performing data transmission/reception between a network side and a UE in a situation of multiple TPs to which a method and/or embodiments proposed in the present disclosure may be applied.

FIG. 10 illustrates signaling between a network side (e.g., TRP1, TRP2, BS) and the UE in a situation of multiple TRPs (i.e., M-TRP or multiple cells, hereinafter, all TRPs may be replaced with cells) to which the methods (e.g., Proposal Method 1/2/3/4 etc.) proposed in the present disclosure may be applied. Here, the UE/network side is just an example, and may be replaced with and applied to various devices as described in FIGS. 13 to 17 described below. FIG. 10 is just for convenience of the description and does not limit the scope of the present disclosure. Further, some step(s) illustrated in FIG. 10 may be omitted according to a situation and/or a configuration.

Referring to FIG. 10, for convenience of the description, signaling between two TRPs (e.g., TRP1 and TRP2) and the UE is considered, but the corresponding signaling scheme may be extensively applied even to signaling between multiple TRPs and multiple UEs. In the following description, the network side may be one base station including a plurality of TRPs, and may be one cell including the plurality of TRPs. As an example, ideal/non-ideal backhaul may also be configured between TRP 1 and TRP 2 constituting the network side. Further, the following description is made based on multiple TRPs, but this may be extensively applied even to transmission through multiple panels in the same manner. In addition, in the present disclosure, an operation of the UE receiving a signal TRP1/TRP2 may be construed/described even as an operation of the UE receiving the signal from the network side (through/using TRP1/2) (or may be an operation), and an operation of the UE transmitting the signal to TRP1/TRP2 may be construed/described even as an operation of the UE transmitting the signal to the network side (through/using TRP1/TRP2) (or may be an operation), and reversely construed/described.

Specifically, FIG. 10 illustrates signaling when the UE receives multiple DCIs (i.e., when each TRP transmits the DCI to the UE) in a situation of M-TRP (alternatively, cells, hereinafter, all TRPs may be replaced with the cells or even when multiple CORESETs (/CORESET groups) are configured from one TRP, the corresponding TRP may be assumed as M-TRP).

The UE may receive configuration information for multiple TRP based transmission and reception from the network side through/using TRP1 (and/or TRP2) (S1005). That is, the network side may transmit configuration information related to multiple TRP based transmission and reception to the UE through/using TRP1 (and/or TRP2) (S1005). The configuration information may include resource information related to a configuration (i.e., TRP configuration) of the network side, resource information (resource allocation) related to the multiple TRP based transmission and reception, etc. In this case, the configuration information may be transferred through higher layer signaling (e.g., RRC signaling, MAC-CE, etc.). Further, when the configuration information is previously defined or configured, the corresponding step may also be skipped.

For example, the configuration information may include information (e.g., information on enabling/disabling of the operation) for the operation described in the above-described proposal method (e.g., Proposal Method 1/2/3/4, etc.). As an example when uplink resources related to each TRP collide, enabling indication information for the UE operation (e.g., drop/piggyback/rate matching/puncturing) may be included. Further, information (e.g., PDCCH monitoring occasion related information) related a time domain location to which the DCI is to be transmitted may be included.

For example, the operation of the UE (100/200 in FIGS. 13 to 17) which receives the multiple TRP based transmission and reception related configuration information from the network side (100/200 in FIGS. 13 to 17) in step S1005 described above may be implemented by devices in FIGS. 13 to 17 to be described below. For example, referring to FIG. 13, one or more processors 102 may control one or more transceivers 106 and/or one or more memories 104 so as to receive the multiple TRP based transmission and reception related configuration information, and one or more transceivers 106 may receive configuration information and one or more transceivers 106 may receive the multiple TRP based transmission and reception related configuration information from the network side.

Likewise, the operation of the network side (100/200 in FIGS. 13 to 17) which transmits the multiple TRP based transmission and reception related configuration information to the UE (100/200 in FIGS. 13 to 17) in step S1005 described above may be implemented by the devices in FIGS. 13 to 17 to be described below. For example, referring to FIG. 13, one or more processors 102 may control one or more transceivers 106 and/or one or more memories 104 so as to transmit the multiple TRP based transmission and reception related configuration information, and one or more transceivers 106 may receive configuration information and one or more transceivers 106 may transmit the multiple TRP based transmission and reception related configuration information from the network side.

The UE may receive, from the network side, DCI 1 (e.g., first control information) and Data 1 (e.g., first data) scheduled by corresponding DCI 1 through/using TRP 1 (S1010-1). Further, the UE may receive, from the network side, DCI 2 (e.g., second control information) and Data 2 (e.g., second data) scheduled by corresponding DCI 2 through/using TRP 2 (S1010-2). That is, the network side may transmit, to the UE, DCI 1 and Data 1 scheduled by corresponding DCI through/using TRP 1 (S1010-1). Further, the network side may transmit, to the UE, DCI 2 and Data 2 scheduled by corresponding DCI 2 through/using TRP 2 (S1010-2).

For example, when DCI 1 and DCI 2 are received by different CORESETs (or CORESETs which belong to different CORESET groups), the UE may recognize that DCI 1 and DCI 2 are received from different TRPs.

For example, DCI 1 and DCI 2 may be received from the same cell having the same serving cell index in the same PDCCH monitoring occasion.

For example, DCI 1 and DCI 2 may include resource allocation information for uplink channels (e.g., PUCCH and PUSCH). As an example, an uplink resource for TRP 1 and an uplink resource for TRP 2 may belong to different resource groups, respectively, and may be allocated to be included in the same sub-slot.

Each of DCI 1 and DCI 2 may include a Downlink Assignment Index (DAI) field. For example, a value of the DAI included in each DCI may be configured based on an index (or ID) related to each TRP. As an example, the index (or ID) related to the TRP may correspond to the CORESET group index or the CORESET index. As an example, the DAI value may be configured in ascending order of the index related to each TRP. Specifically, the DAI value may be configured based on the index related to each TRP, the PDCCH monitoring occasion, and the serving cell index. The DAI value may increase in ascending order of the PDCCH monitoring occasion, when DAI values for multiple serving cells are simultaneously transmitted in the same PDCCH monitoring occasion, the DAI values may increase in ascending order of the serving cell index, and when DAI values for multiple TRPs are simultaneously received in the same PDCCH monitoring occasion and the same serving cell, the DAI values may increase in ascending order of the TRP index (or CORESET group index).

For example, when DCI 1 and DCI 2 are received from the same cell having the same serving cell index in the same PDCCH monitoring occasion, and the values of the DAIs included in the respective DCIs are equal to each other, the UE may ignore a DAI value included in a DCI transmitted by a TRP corresponding to a lower index among TRP indices and recognize that the DAI is configured to 'received DAI value −1' or ignore the corresponding DCI. Alternatively, the network side may also configure the PDCCH monitoring occasions of different TRPs to be continuously different from each other.

For example, DCI 1 and/or DCI 2 may include indication information (e.g., information on indicating whether to perform piggyback/rate matching/drop) for the operation described in the above-described proposal method (e.g., Proposal Method 1/2/3/4, etc.).

Further, for example, DCI (e.g., DCI 1, DCI 2) and Data (e.g., Data 1, Data 2) may be transferred through a control channel (e.g., PDCCH, etc.) and a data channel (e.g., PDSCH, etc.), respectively. Further, steps S1010- and S1010-2 may be simultaneously performed or any one may be performed earlier than the other one.

For example, the operation of the UE (100/200 in FIGS. 13 to 17) which receives DCI 1 and/or DCI 2 and/or Data 1 and/or Data 2 from the network side (100/200 in FIGS. 13 to 17) in step S1010-1/S1010-2 described above may be implemented by the devices in FIGS. 13 to 17 to be described below. For example, referring to FIG. 13, one or more processor 102 may control one or more transceivers 106 and/or one or more memories 104 to receive DCI 1 and/or DCI 2 and/or Data 1 and/or Data 2, and one or more transceivers 106 may receive, from the network side, DCI 1 and/or DCI 2 and/or Data 1 and/or Data 2.

Likewise, the operation of the network side (100/200 in FIGS. 13 to 17) which transmits DCI 1 and/or DCI 2 and/or Data 1 and/or Data 2 to the UE (100/200 in FIGS. 13 to 17) in step S1010-1/S1010-2 described above may be implemented by the devices in FIGS. 13 to 17 to be described below. For example, referring to FIG. 13, one or more processor 102 may control one or more transceivers 106 and/or one or more memories 104 to transmit DCI 1 and/or DCI 2 and/or Data 1 and/or Data 2, and one or more transceivers 106 may transmit, to the UE, DCI 1 and/or DCI 2 and/or Data 1 and/or Data 2.

The UE may decode Data 1 and Data 2 (e.g., first data and second data) received from TRP 1 and TRP 2 (S1015). For example, the UE may decode Data 1/Data 2 based on the above-described proposal method (e.g., Proposal Method 1/2/3/4, etc.).

For example, the operation of the UE (e.g., reference numeral 100 and/or 200 of FIGS. 13 to 17) which decodes Data 1 and Data 2 in step S1015 described above may be implemented by the devices of FIGS. 1 to 2 to be described below. For example, referring to FIG. 13, one or more processor 102 may control one or more memories 104 to perform the operation of decoding Data 1 and Data 2.

The UE may transmit, to the network side, HARQ-ACK information (e.g., ACK information, NACK information, etc.) (e.g., first feedback information and/or second feedback information) for Data 1 and/or Data 2 through one or more PUCCH(s) through/using TRP 1 and/or TRP 2, based on the above-described method (e.g., Proposal Method 1/2/3/4, etc.) (S1020-1 and S1020-2). That is, the network side may receive, from the UE, HARQ-ACK information (e.g., ACK information, NACK information, etc.) (e.g., first feedback information and/or second feedback information) for Data 1 and/or Data 2 through/using TRP 1 and/or TRP 2, based on the above-described method (e.g., Proposal Method 1/2/3/4, etc.) (S1020-1 and S1020-2). The UE may construct a codebook for the HARQ-ACK information according to the DAI value transmitted through the DCI (e.g., DCI 1 and DCI 2). Further, the HARQ-ACK information (e.g., first feedback information and second feedback information) may be transmitted based on resource allocation information received from the network side.

For example, the UE may transmit, to the network side, the HARQ-ACK information (e.g., first feedback information) for Data 1 through/using TRP 1 (S1020-1) and transmit, to the network side, the HARQ-ACK information (e.g., second feedback information) for Data 2 through/using TRP 2 (S1020-2). The UE may recognize PUCCH (or PUSCH) scheduled by DCI (e.g., DCI 1 and DCI 2) received by different CORESETs (or CORESETs which belong to different CORESET groups) as PUCCH (or PUSCH) transmitted to different TRPs or PUCCH (or PUSCH) of different TRPs.

In this case, a resource (e.g., PUCCH resource) for the HARQ-ACK information (e.g., first feedback information) for Data 1 and a resource (e.g., PUCCH resource) for the HARQ-ACK information (e.g., second feedback information) for Data 2 may overlap (collide) with each other. Alternatively, a resource (e.g., PUCCH resource) for HARQ-ACK information transmitted to the network side through TRP 1/TRP 2 and a data resource (e.g., PUSCH resource) transmitted to the network side through TRP 1/TRP 2 may overlap (collide) with each other. In this case, the UE may operate based on the priority rules described in Proposal Method 1, Proposal Method 2, etc., described above.

For example, the UE may drop information having a lower priority or piggyback and transmit the PUCCH/PUSCH having the lower priority to the PUCCH/PUSCH having the higher priority, or puncture or rate-match the PUCCH/PUSCH having the lower priority.

For example, the priority rule may be based on one of i) PDSCH-config IE/PDCCH-config IE, ii) corset or CORESET group id, iii) search space or search space group id, or iv) TCI group ID. Alternatively, the priority rule may be based on RNTI (e.g., C-RNTI, UE-RNTI, etc.) related to the DCI. Alternatively, the priority rule may be based on the PUCCH format. As an example, the priority may be determined according to a length of the PUCCH, a payload size of the PUCCH, or whether to support multiplexing. Alternatively, the priority may be based on resource/resource set ID. Alternatively, the priority may be determined based on the DAI value included in the DCI. Alternatively, the priority may be determined based on a size of the HARQ-ACK information (e.g., first feedback information and second feedback information). As an example, the priority may be determined based on a size of the ACK/NACK codebook. Alternatively, the priority may be determined based on contents included in the PUCCH. Alternatively, the priority may be determined by a combination of information related to the priority rule. As an example, the priority may be determined based on the size of the ACK/NACK codebook, but when the sizes of the ACK/NACK codebook are equal to each other, the priority may be determined according to another information.

For example, when the resource (e.g., PUCCH resource) for HARQ-ACK information transmitted to the network side through TRP 1/TRP 2 and the data resource (e.g., PUSCH resource) transmitted to the network side through TRP 1/TRP 2 may overlap (collide) with each other (e.g., symbols, slots, or REs overlap), the priority may be determined based on contents included in the data resource (e.g., PUSCH resource). As an example, a PUCCH including the HARQ-ACK information (e.g., ACK/NACK) may take precedence over a PUSCH including uplink data or UCI (semi-persistent CSI/aperiodic CSI).

Further, if the UE performs puncturing or rate matching for a resource having a lower priority based on the priority rule, the UE may transmit, to the network side, information (e.g., whether the operation is performed and positional information of a performed resource (e.g., RE)) on a performed operation.

For example, the UE may be configured to transmit the HARQ-ACK information for Data 1 and Data 2 to representative TRP (e.g., TRP 1), and transmission of the HARQ-ACK information to the other TRP (e.g., TRP 2) may also be skipped. The HARQ-ACK information transmitted to the representative TRP may be shared by the other TRP through backhaul. That is, the HARQ-ACK information (e.g., first feedback and second feedback information) for Data 1 and Data 2 may be combined into one (together encoded) and transmitted to the network side through one PUCCH. In this case, the methods and/or examples of Proposal Method 3 described above may be used.

For example, when the HARQ-ACK information (e.g., first feedback information) for Data 1 and the HARQ-ACK information (e.g., second feedback information) for Data 2 have different payload sizes, the HARQ-ACK information may be encoded based on a bit number of HARQ-ACK information having a larger payload size. Alternatively, when the HARQ-ACK information (e.g., first feedback information) for Data 1 and the HARQ-ACK information (e.g., second feedback information) for Data 2 may be configured as a pair and encoded with a bit number corresponding to the sum of bit numbers of respective information.

For example, the operation of the UE (100/200 in FIGS. 13 to 17) which transmits the HARQ-ACK information for Data 1 and/or Data 2 to the network side (100/200 in FIGS. 13 to 17) through one or more PUCCHs in step S1020-1/S1020-2 described above may be implemented by the devices in FIGS. 13 to 17 to be described below. For example, referring to FIG. 13, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2 through one or more PUCCHs.

Likewise, the operation of the network side (100/200 in FIGS. 13 to 17) which receives the HARQ-ACK information for Data 1 and/or Data 2 from the UE (100/200 in FIGS. 13 to 17) through one or more PUCCHs in step S1020-1/S1020-2 described above may be implemented by the devices in FIGS. 13 to 17 to be described below. For example, referring to FIG. 13, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2 through one or more PUCCHs.

Figure 11:
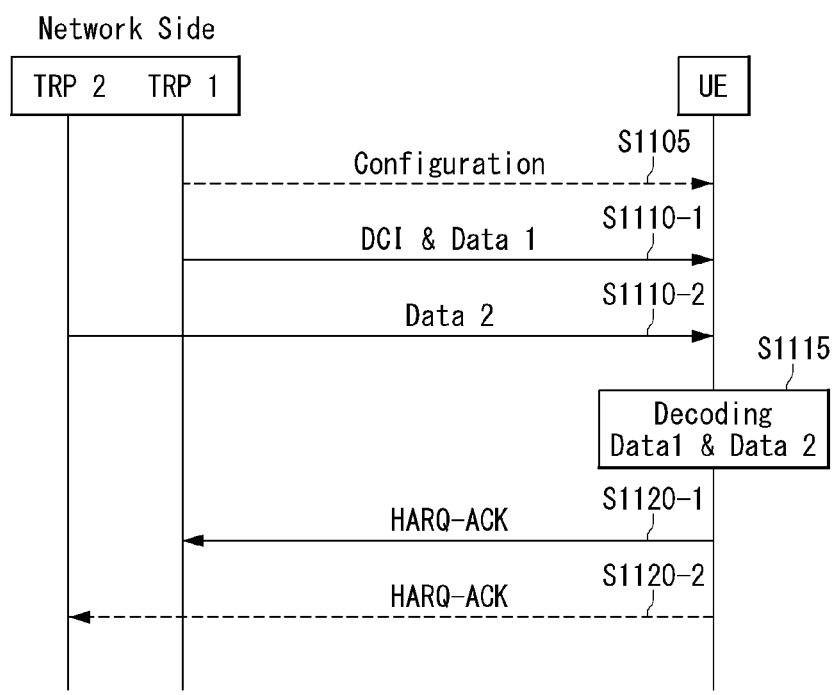
FIG. 11 illustrates yet another example of a signaling procedure of performing data transmission/reception between a network side and a UE in a situation of multiple TPs to which a method and/or embodiments proposed in the present disclosure may be applied.

FIG. 11 illustrates signaling when the UE receives a single DCI (i.e., when one TRP transmits the DCI to the UE) in a situation of M-TRP (alternatively, M-cells, hereinafter, all TRPs may be replaced with the cells or even when multiple CORESETs (/CORESET groups) are configured from one TRP, the corresponding TRP may be assumed as M-TRP). In FIG. 11, it is assumed that TRP 1 is representative TRP transmitting the DCI.

The UE may receive configuration information for multiple TRP based transmission and reception from the network side through/using TRP1 (and/or TRP2) (S1105). That is, the network side may transmit configuration information related to multiple TRP based transmission and reception to the UE through/using TRP 1 (and/or TRP 2) (S1105). The configuration information may include resource information related to a configuration (i.e., TRP configuration) of the network side, resource information (resource allocation) related to the multiple TRP based transmission and reception, etc. In this case, the configuration information may be transferred through higher layer signaling (e.g., RRC signaling, MAC-CE, etc.). Further, when the configuration information is previously defined or configured, the corresponding step may also be skipped.

For example, the configuration information may include information (e.g., information on enabling/disabling of the operation) for the operation described in the above-described proposal method (e.g., Proposal Method 1/2/3/4, etc.). As an example when uplink resources related to each TRP collide, enabling indication information for the UE operation (e.g., drop/piggyback/rate matching/puncturing) may be included. Further, information (e.g., PDCCH monitoring occasion related information) related a time domain location to which the DCI is to be transmitted may be included.

For example, the operation of the UE (100/200 in FIGS. 13 to 17) which receives the multiple TRP based transmission and reception related configuration information from the network side (100/200 in FIGS. 13 to 17) in step S1105 described above may be implemented by devices in FIGS. 13 to 17 to be described below. For example, referring to FIG. 13, one or more processors 102 may control one or more transceivers 106 and/or one or more memories 104 so as to receive the multiple TRP based transmission and reception related configuration information, and one or more transceivers 106 may receive configuration information and one or more transceivers 106 may receive the multiple TRP based transmission and reception related configuration information from the network side.

Likewise, the operation of the network side (100/200 in FIGS. 13 to 17) which transmits the multiple TRP based transmission and reception related configuration information to the UE (100/200 in FIGS. 13 to 17) in step S1105 described above may be implemented by the devices in FIGS. 13 to 17 to be described below. For example, referring to FIG. 13, one or more processors 102 may control one or more transceivers 106 and/or one or more memories 104 so as to transmit the multiple TRP based transmission and reception related configuration information, and one or more transceivers 106 may receive configuration information and one or more transceivers 106 may transmit the multiple TRP based transmission and reception related configuration information from the network side.

The UE may receive, from the network side, DCI and Data 1 scheduled by corresponding DCI through/using TRP 1 (S1110-1). Further, the UE may receive Data 2 from the network side through/using TRP 2 (S1110-2). That is, the network side may transmit, to the UE, DCI 1 and Data 1 scheduled by corresponding DCI through/using TRP 1 (S1110-1). Further, the network side may transmit Data 2 to the UE through/using TRP 2 (S1110-2). Here, the DCI may be configured to be used for scheduling both Data 1 and Data 2. The DCI may further include a Downlink Assignment Index (DAI) field.

For example, a value of the DAI included in the DCI may be configured based on an index (or ID) of each TRP. As an example, the index (or ID) of the TRP may correspond to the CORESET group index or the CORESET index. As an example, the DAI value may be configured in ascending order of the index of each TRP. Specifically, the DAI value may be configured based on the index of each TRP, the PDCCH monitoring occasion, and the serving cell index. The DAI value may increase in ascending order of the PDCCH monitoring occasion, when DAI values for multiple serving cells are simultaneously transmitted in the same PDCCH monitoring occasion, the DAI values may increase in ascending order of the serving cell index, and when DAI values for multiple TRPs are simultaneously received in the same PDCCH monitoring occasion and the same serving cell, the DAI values may increase in ascending order of the TRP index (or CORESET group index).

For example, the network side may also configure the PDCCH monitoring occasions of different TRPs to be continuously different from each other.

For example, the DCI may include indication information (e.g., information on indicating whether to perform piggyback/rate matching/drop) for the operation described in the above-described proposal method (e.g., Proposal Method 1/2/3/4, etc.).

Further, for example, DCI and Data (e.g., Data 1, Data 2) may be transferred through a control channel (e.g., PDCCH, etc.) and a data channel (e.g., PDSCH, etc.), respectively. Further, steps S1110-1 and S1110-2 may be simultaneously performed or any one may be performed earlier than the other one.

For example, the operation of the UE (100/200 in FIGS. 13 to 17) which receives the DCI and/or Data 1 and/or Data 2 from the network side (100/200 in FIGS. 13 to 17) in step S1110-1/S1110-2 described above may be implemented by the devices in FIGS. 13 to 17 to be described below. For example, referring to FIG. 13, one or more processor 102 may control one or more transceivers 106 and/or one or more memories 104 to receive the DCI and/or Data 1 and/or Data 2, and one or more transceivers 106 may receive, from the network side, the DCI and/or Data 1 and/or Data 2.

Likewise, the operation of the network side (100/200 in FIGS. 13 to 17) which transmits the DCI and/or Data 1 and/or Data 2 to the UE (100/200 in FIGS. 13 to 17) in step S1110-1/S1110-2 described above may be implemented by the devices in FIGS. 13 to 17 to be described below. For example, referring to FIG. 13, one or more processor 102 may control one or more transceivers 106 and/or one or more memories 104 to transmit the DCI and/or Data 1 and/or Data 2, and one or more transceivers 106 may transmit, to the UE, the DCI and/or Data 1 and/or Data 2.

The UE may decode Data 1 and Data 2 received from TRP 1 and TRP 2 (S1115). For example, the UE may decode Data 1/Data 2 based on the above-described proposal method (e.g., Proposal Method 1/2/3/4, etc.).

For example, the operation of the UE (e.g., reference numeral 100 and/or 200 of FIGS. 13 to 17) which decodes Data 1 and Data 2 in step S1115 described above may be implemented by the devices of FIGS. 13 to 17 to be described below. For example, referring to FIG. 13, one or more processor 102 may control one or more memories 104 to perform the operation of decoding Data 1 and Data 2.

The UE may transmit, to the network side, HARQ-ACK information (e.g., ACK information, NACK information, etc.) (e.g., first feedback information and/or second feedback information) for Data 1 and/or Data 2 through one or more PUCCH(s) through/using TRP 1 and/or TRP 2, based on the above-described method (e.g., Proposal Method 1/2/3/4, etc.) (S1120-1 and S1120-2). That is, the network side may receive, from the UE, HARQ-ACK information (e.g., ACK information, NACK information, etc.) (e.g., first feedback information and/or second feedback information) for Data 1 and/or Data 2 through/using TRP 1 and/or TRP 2, based on the above-described method (e.g., Proposal Method 1/2/3/4, etc.) (S1220-1 and S1220-2). The UE may construct a codebook for the HARQ-ACK information according to the DAI value transmitted through the DCI. Further, the HARQ-ACK information (e.g., first feedback information and second feedback information) may be transmitted based on resource allocation information received from the network side.

For example, the UE may transmit, to the network side, the HARQ-ACK information (e.g., first feedback information) for Data 1 through/using TRP 1 (S1120-1) and transmit, to the network side, the HARQ-ACK information (e.g., second feedback information) for Data 2 through/using TRP 2 (S1120-2). In this case, a resource (e.g., PUCCH resource) for the HARQ-ACK information (e.g., first feedback information) for Data 1 and a resource (e.g., PUCCH resource) for the HARQ-ACK information (e.g., second feedback information) for Data 2 may overlap (collide) with each other. Alternatively, a resource (e.g., PUCCH resource) for HARQ-ACK information transmitted to the network side through TRP 1/TRP 2 and a data resource (e.g., PUSCH resource) transmitted to the network side through TRP 1/TRP 2 may overlap (collide) with each other. In this case, the UE may operate based on the priority rules described in Proposal Method 1, Proposal Method 2, etc., described above.

For example, the UE may drop information having a lower priority or piggyback and transmit the PUCCH/PUSCH having the lower priority to the PUCCH/PUSCH having the higher priority, or puncture or rate-match the PUCCH/PUSCH having the lower priority.

For example, the priority rule may be based on the PUCCH format. As an example, the priority may be determined according to a length of the PUCCH, a payload size of the PUCCH, or whether to support multiplexing. Alternatively, the priority may be based on resource/resource set ID. Alternatively, the priority may be determined based on a size of the HARQ-ACK information (e.g., first feedback information and second feedback information). As an example, the priority may be determined based on a size of the ACK/NACK codebook. Alternatively, the priority may be determined based on contents included in the PUCCH. Alternatively, the priority may be determined by a combination of information related to the priority rule. As an example, the priority may be determined based on the size of the ACK/NACK codebook, but when the sizes of the ACK/NACK codebook are equal to each other, the priority may be determined according to another information.

For example, when the resource (e.g., PUCCH resource) for HARQ-ACK information transmitted to the network side through TRP 1/TRP 2 and the data resource (e.g., PUSCH resource) transmitted to the network side through TRP 1/TRP 2 may overlap (collide) with each other (e.g., symbols, slots, or REs overlap), the priority may be determined based on contents included in the data resource (e.g., PUSCH resource). As an example, a PUCCH including the HARQ-ACK information (e.g., ACK/NACK) may take precedence over a PUSCH including uplink data or UCI (semi-persistent CSI/aperiodic CSI).

Further, if the UE performs puncturing or rate matching for a resource having a lower priority based on the priority rule, the UE may transmit, to the network side, information (e.g., whether the operation is performed and positional information of a performed resource (e.g., RE)) on a performed operation.

For example, the UE may be configured to transmit the HARQ-ACK information for Data 1 and Data 2 to representative TRP (e.g., TRP 1), and transmission of the HARQ-ACK information to the other TRP (e.g., TRP 2) may also be skipped. The HARQ-ACK information transmitted to the representative TRP may be shared by the other TRP through backhaul. That is, the HARQ-ACK information (e.g., first feedback and second feedback information) for Data 1 and Data 2 may be combined into one (together encoded) and transmitted to the network side through one PUCCH. In this case, the methods and/or examples of Proposal Method 3 described above may be used.

For example, when the HARQ-ACK information (e.g., first feedback information) for Data 1 and the HARQ-ACK information (e.g., second feedback information) for Data 2 have different payload sizes, the HARQ-ACK information may be encoded based on a bit number of HARQ-ACK information having a larger payload size. Alternatively, when the HARQ-ACK information (e.g., first feedback information) for Data 1 and the HARQ-ACK information (e.g., second feedback information) for Data 2 may be configured as a pair and encoded with a bit number corresponding to the sum of bit numbers of respective information.

For example, the operation of the UE (100/200 in FIGS. 13 to 17) which transmits the HARQ-ACK information for Data 1 and/or Data 2 to the network side (100/200 in FIGS. 13 to 17) through one or more PUCCHs in step S1120-1/S1120-2 described above may be implemented by the devices in FIGS. 13 to 17 to be described below. For example, referring to FIG. 13, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2 through one or more PUCCHs.

Likewise, the operation of the network side (100/200 in FIGS. 13 to 17) which receives the HARQ-ACK information for Data 1 and/or Data 2 from the UE (100/200 in FIGS. 13 to 17) through one or more PUCCHs in step S1120-1/S1120-2 described above may be implemented by the devices in FIGS. 13 to 17 to be described below. For example, referring to FIG. 13, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2 through one or more PUCCHs.

Figure 12:
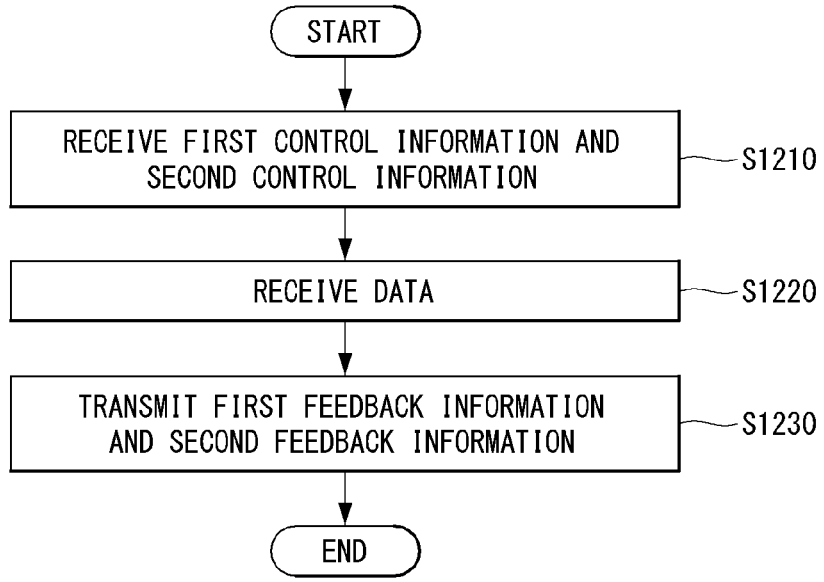
FIG. 12 illustrates an example of an operation flowchart of a UE performing data transmission/reception to which a method and/or embodiments proposed in the present disclosure may be applied.

FIG. 12 illustrates an example a data transmission/reception operation flowchart of a user equipment (UE) supported by multiple devices including a first device and a second device to which the method (e.g., Proposal 1/2/3/4, etc.) proposed in the present disclosure. Here, multiple devices including the first device and the second device may be replaced with/correspond to the TRP, a base station, a transmission point (TP), a cell (e.g., macro cell/small cell/pico cell), an antenna array, or a panel, and appreciated. As an example, multiple devices including the first device and the second device may be objects which may be distinguished based on the CORESET group (or CORESET) index (or ID).

Further, ideal/non-ideal backhaul may be configured between multiple devices including the first device and the second device. Referring to FIG. 12, for convenience of the description, signaling between two devices, i.e., a first device and a second device (e.g., TRP1 and TRP2) and the UE is considered, but the corresponding signaling scheme may be extensively applied even to signaling between multiple TRPs and multiple UEs. FIG. 12 is just for convenience of the description and does not limit the scope of the present disclosure. Further, some step(s) illustrated in FIG. 12 may be omitted according to a situation and/or a configuration.

The UE may receive, from a first device, first control information (e.g., DCI 1), and receive, from a second device, second control information (e.g., DCI 2) (S1210). That is, the UE may receive the first control information and the second control information in different CORESETs (or CORESETs which belong to different CORESET groups). Each of the first control information and the second control information may correspond to the DCI and include a Downlink Assignment Index (DAI). The first control information and the second control information may be delivered through a control channel (e.g., PDCCH).

For example, the first control information (e.g., DCI 1) and the second control information (e.g., DCI 2) may be received from the same cell having the same serving cell index in the same time domain location (e.g., PDCCH monitoring occasion).

For example, the first control information and the second control information may include resource allocation information for uplink channels (e.g., PUCCH and PUSCH). As an example, an uplink resource for the first device and an uplink resource for the second device may belong to different resource groups, respectively, but may be allocated to be included in the same sub-slot.

For example, the DAI may be configured based on indices related to the multiple devices. The indices related to the multiple devices may correspond to CORESET group indices or CORESET indices. As an example, the DAI value may be configured in ascending order of the indices related to the multiple devices. Further, the DAI may be configured by further considering indices of a time domain location (e.g., PDCCH monitoring occasion) to which control information (e.g., first control information and second control information) is to be transmitted and a serving cell.

As a specific example, the DAI value may increase in ascending order of the PDCCH monitoring occasion, when DAI values for multiple serving cells are simultaneously transmitted in the same PDCCH monitoring occasion, the DAI values may increase in ascending order of the serving cell index, and when DAI values for multiple devices are simultaneously received in the same PDCCH monitoring occasion and the same serving cell, the DAI values may increase in ascending order of the indices (e.g., CORESET group index) related to multiple devices.

As another specific example, when the first control information and the second control information are received from the same cell having the same serving cell index in the same time domain location (e.g., PDCCH monitoring occasion) and respective DAI values are equal to each other, the UE may recognize that a value acquired by subtracting 1 from a DAI value transmitted from a device having a lower index is received.

For example, the first control information and the second control information may be configured as a pair and for the control information configured as a pair, the same DAI value may be configured.

The UE may receive, from at least one of the multiple devices, configuration information before step S1210. The configuration information may be delivered through higher layer signaling (e.g., RRC signaling, MAC-CE, etc.). When the configuration information is previously defined or configured, the operation of receiving the configuration information may also be omitted. For example, the configuration information may include information related to configurations of multiple devices, a configuration related to the time domain location to which the control information is to be transmitted, enabling indication information for an operation (e.g., drop/piggyback/rate matching/puncturing) related to feedback information (e.g., HARQ-ACK information), etc. As an example, the configuration may include information on the PDCCH monitoring occasion. The first control information and the second control information may also be received in the same time domain location (e.g., PDCCH monitoring occasion) based on the configuration.

For example, the operation of the UE (100/200 in FIGS. 13 to 17) which receives, from the first device (100/200 in FIGS. 13 to 17), first control information and receives, from the second device (100/200 in FIGS. 13 to 17), second control information in step S1210 described above may be implemented by the devices in FIGS. 13 to 17 to be described below. For example, referring to FIG. 13, one or more processors 102 may control one or more transceivers 106 and/or one or more memories 104 so as to receive the first control information the second control information and one or more transceivers 106 may receive the first control information the second control information from the first device and the second device, respectively.

The UE may receive, from at least one of the first device or the second device, data (S1220). The data may be scheduled based on at least one of the first control information or the second control information. The data may be received through a data channel (e.g., PDSCH).

For example, the operation of the UE (100/200 in FIGS. 13 to 17) which receives, from at least one of the first device (100/200 in FIGS. 13 to 17) or the second device (100/200 in FIGS. 13 to 17), the data may be implemented by the devices in FIGS. 13 to 17 to be described below. For example, referring to FIG. 13, one or more processors 102 may control one or more transceivers 106 and/or one or more memories 104 so as to receive the data and one or more transceivers 106 may receive the information may receive, from at least one of the first device or the second device, the data.

The UE may transmit, to at least one of the first device or the second device, first feedback information for the first device and second feedback information for the second device (S1230). The first feedback information may be HARQ-ACK information (e.g., ACK/NACK) for the first control information and/or data transmitted by the first device and the second feedback information may be HARQ-ACK information (e.g., ACK/NACK) for the second control information and/or data transmitted by the second device.

For example, the UE may jointly encode the first feedback information and the second feedback information, and transmit, to one of the first device or the second device, the encoded feedback information through one uplink channel (e.g., PUCCH). In this case, the first feedback information and the second feedback information may be jointly encoded based on a bit number of feedback information having a larger payload size among the first feedback information and the second feedback information. Alternatively, the first feedback information and the second feedback information may be jointly encoded with a bit number corresponding to the sum of a bit number of the first feedback information and a bit number of the second feedback information.

For example, the UE may transmit, to the first device, the first feedback information through the uplink channel (e.g., PUCCH) and transmit, to the second device, the second feedback information through the uplink channel (e.g., PUCCH). The UE may recognize PUSCH (or PUCCH) scheduled by the control information (e.g., the first control information and the second control information) received by different CORESETs (or CORESETs which belong to different CORESET groups) as PUSCH (or PUCCH) transmitted to different devices (e.g. the first device and the second device) or as PUSCHs (or PUCCHs) of different devices (e.g., the first device and the second device).

In this case, a resource for the first feedback information and a resource for the second feedback information may overlap (collide) with each other. Alternatively, a resource for the first feedback information to be transmitted to the first device and a resource for data to be transmitted to the second device may overlap with each other. Alternatively, a resource for the second feedback information to be transmitted to the second device and a resource for data to be transmitted to the first device may overlap with each other. In this case, the UE may perform step S1230 based on the priority rule.

For example, the priority rule may be based on one of i) PDSCH-config IE/PDCCH-config IE, ii) corset or CORESET group id, iii) search space or search space group id, or iv) TCI group ID. Alternatively, the priority rule may be based on RNTI (e.g., C-RNTI, UE-RNTI, etc.) related to the control information (e.g., first control information and second control information). Alternatively, the priority rule may be based on a format of a PUCCH to which the first feedback information and the second feedback information are to be transmitted. As an example, the priority may be determined according to a length of the PUCCH, a payload size of the PUCCH, or whether to support multiplexing. Alternatively, the priority may be determined based on resources/resource set IDs for the first feedback information and the second feedback information. Alternatively, the priority may be determined based on DAI values included in the priority may be determined based on the first feedback information and the second feedback information. Alternatively, the priority may be determined based on sizes (e.g., a size of ACK/NACK codebook) of the first feedback information and the second feedback information. Alternatively, the priority may be determined based on contents included in the PUCCH. Alternatively, the priority may be determined by a combination of information related to the priority rule. As an example, the priority may be determined based on the size of the ACK/NACK codebook, but when the sizes of the ACK/NACK codebook are equal to each other, the priority may be determined according to another information.

For example, when a resource (e.g., PUCCH resource) for feedback information and a resource (e.g., PUSCH resource) for data overlap (collide) with each other, the priority may be determined by considering contents included in the data resource (e.g., PUSCH resource). As an example, a PUCCH including the first feedback information and/or the second feedback information may take precedence over a PUSCH including uplink data or UCI (semi-persistent CSI/aperiodic CSI).

For example, the operation of the UE (100/200 in FIGS. 13 to 17) which transmits, to at least one of the first device (100/200 in FIGS. 13 to 17) and the second device (100/200 in FIGS. 13 to 17), feedback information (e.g., first feedback information and second feedback information) in step S1230 described above may be implemented by the devices in FIGS. 13 to 17 to be described below. For example, referring to FIG. 13, one or more processors 102 may control one or more transceivers 106 and/or one or more memories 104 to transmit the feedback information (e.g., first feedback information and second feedback information), and one or more transceivers 106 may transmit, to at least one of the first device or the second device, the feedback information (e.g., first feedback information and second feedback information).

In response to the UE operation in FIG. 12, an operation order of a base station (BS) may be considered. The BS may correspond to the first device and/or the second device of FIG. 12, and may be replaced with/correspond to the TRP, TP, cell, antenna array, or panel.

The BS may transmit, to a user equipment (UE), control information. The control information may include a Downlink Assignment Index (DAI), and the DAI may be configured based on an index related to the BS. The BS may transmit, to the UE, data based on the control information, and receive, from the UE, feedback information (e.g., HARQ-ACK information) for the control information or the data. Hereinafter, a duplicated description will be omitted.

As mentioned above, the network side/UE signaling and operation (e.g., Proposal Method 1/2/3/4, FIG. 10/11/12, etc.) may be implemented by devices (e.g., FIGS. 13 to 17) to be described below. For example, the network side (e.g., TRP 1/TRP 2) may correspond to a first wireless device and the UE may correspond to a second wireless device and in some cases, an opposite case thereto may also be considered. For example, the first device (e.g., TRP 1)/the second device (e.g., TRP 2) may correspond to the first wireless device and the UE may correspond to the second wireless device and in some cases, an opposite case thereto may also be considered.

Figure 13:
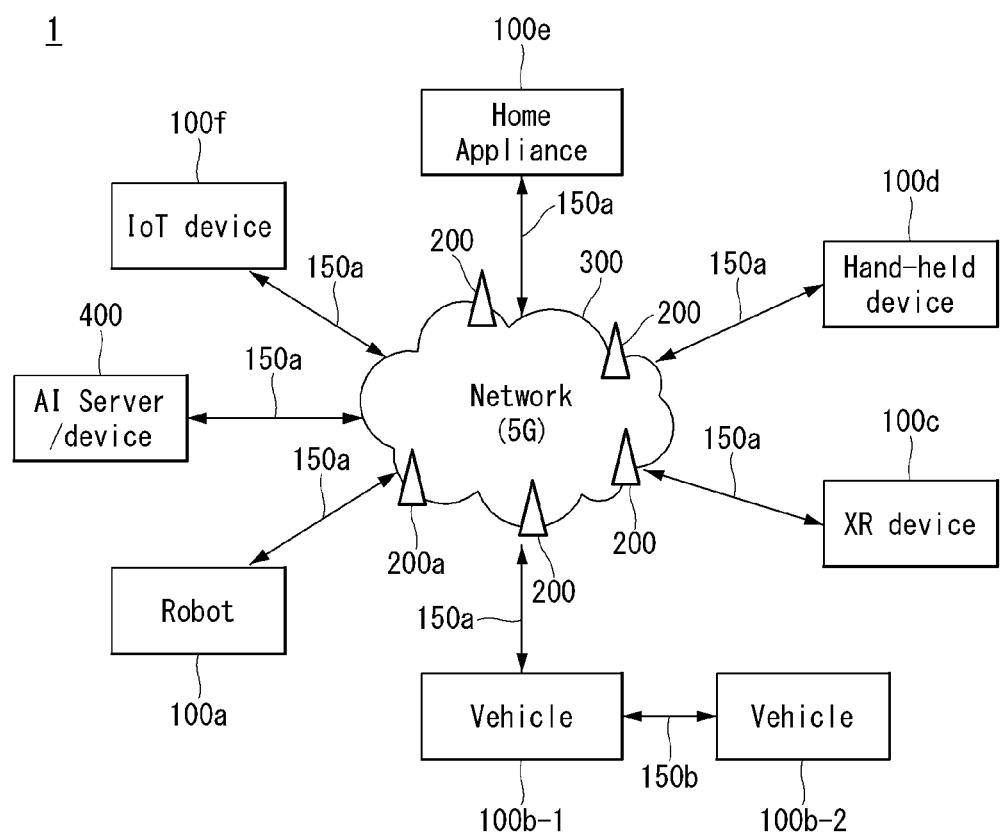
FIG. 13 illustrates a communication system (1) applied to the disclosure.

For example, the network side/UE signaling/operation (e.g., Proposal 1/2/3/4/FIG. 10/11/12, etc.) may be processed by one or more processors (e.g., 102 and 202) in FIGS. 13 to 17 and the network side/UE signaling and operation (e.g., Proposal 1/2/3/4/FIG. 10/11/12, etc.) may be stored in a memory (e.g., one or more memories (e.g., 104 and 204) of FIG. 13) in the form of a command/program (e.g., instruction and executable code) for driving at least one processor (e.g., 102 and 202) in FIGS. 13 to 17.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system applied to the disclosure.

Referring to FIG. 13, a communication system (1) applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

Figure 14:
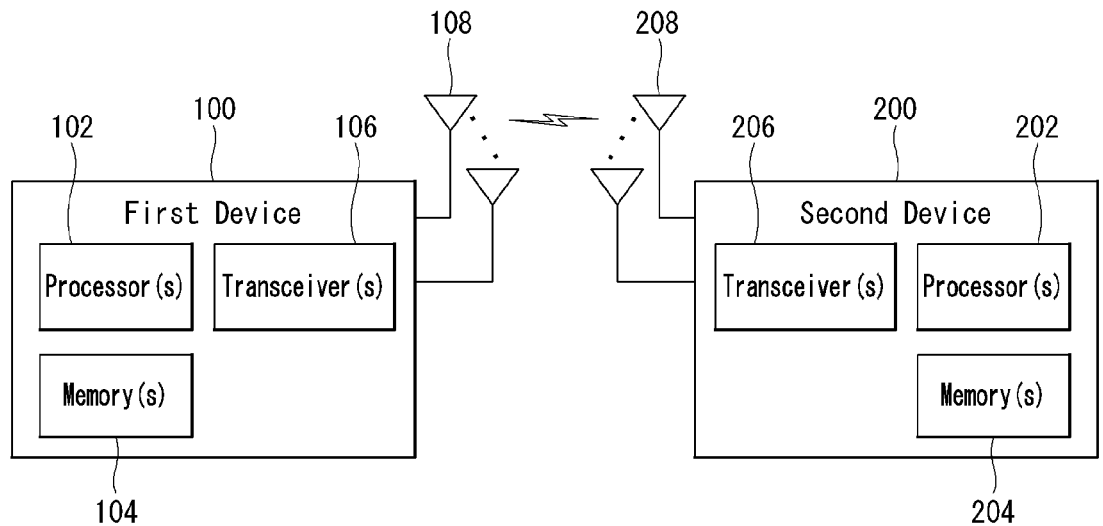
FIG. 14 illustrates a wireless device which may be applied to the disclosure.

FIG. 14 illustrates wireless devices applicable to the disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

Figure 15:
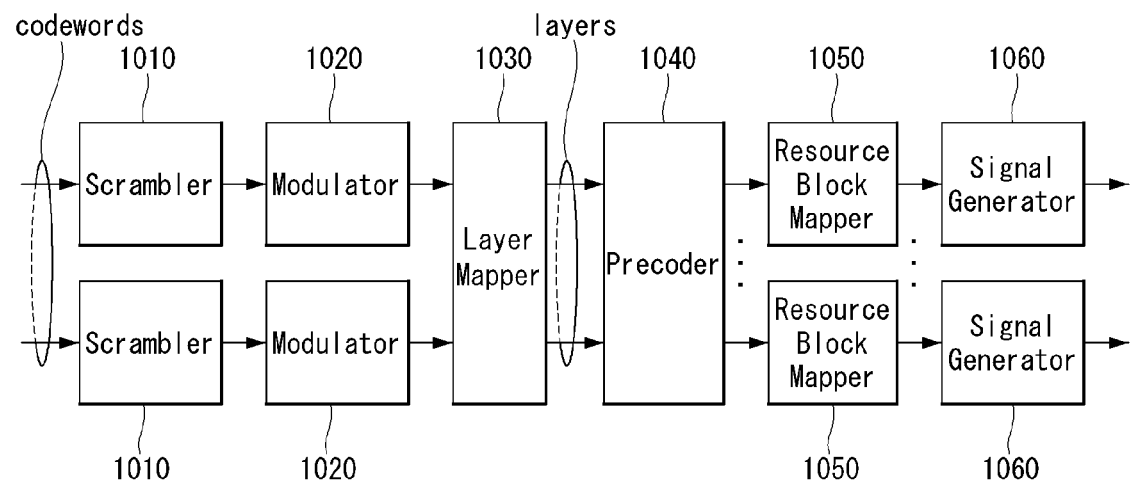
FIG. 15 illustrates a signal processing circuit for a transmit signal.

FIG. 15 illustrates a signal processing circuit for a transmit signal.

Referring to FIG. 15, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 1010 to 1060 may be implemented in the processors 102 and 202 of FIG. 14. Further, blocks 1010 to 1050 may be implemented in the processors 102 and 202 of FIG. 14 and the block 1060 of FIG. 14 and the block 1060 may be implemented in the transceivers 106 and 206 of FIG. 14.

A codeword may be transformed into a radio signal via the signal processing circuit 1000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 15. For example, the wireless device (e.g., 100 or 200 of FIG. 14) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

Figure 16:
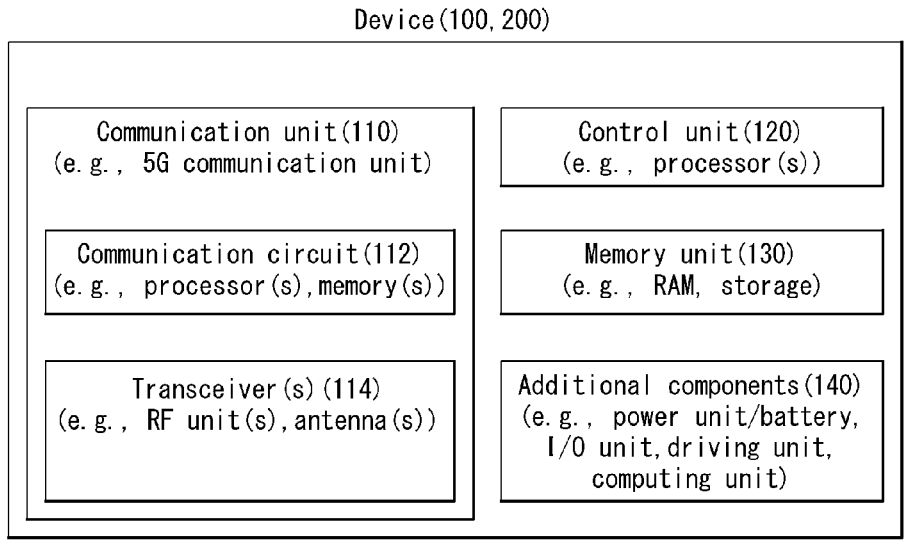
FIG. 16 illustrates another example of a wireless device applied to the disclosure.

FIG. 16 illustrates another example of a wireless device applied to the disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 14. For example, the transceiver(s) 114 may include the one or more transceivers 106 and 106 and/or the one or more antennas 108 and 108 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Disclosure is Applied

Figure 17:
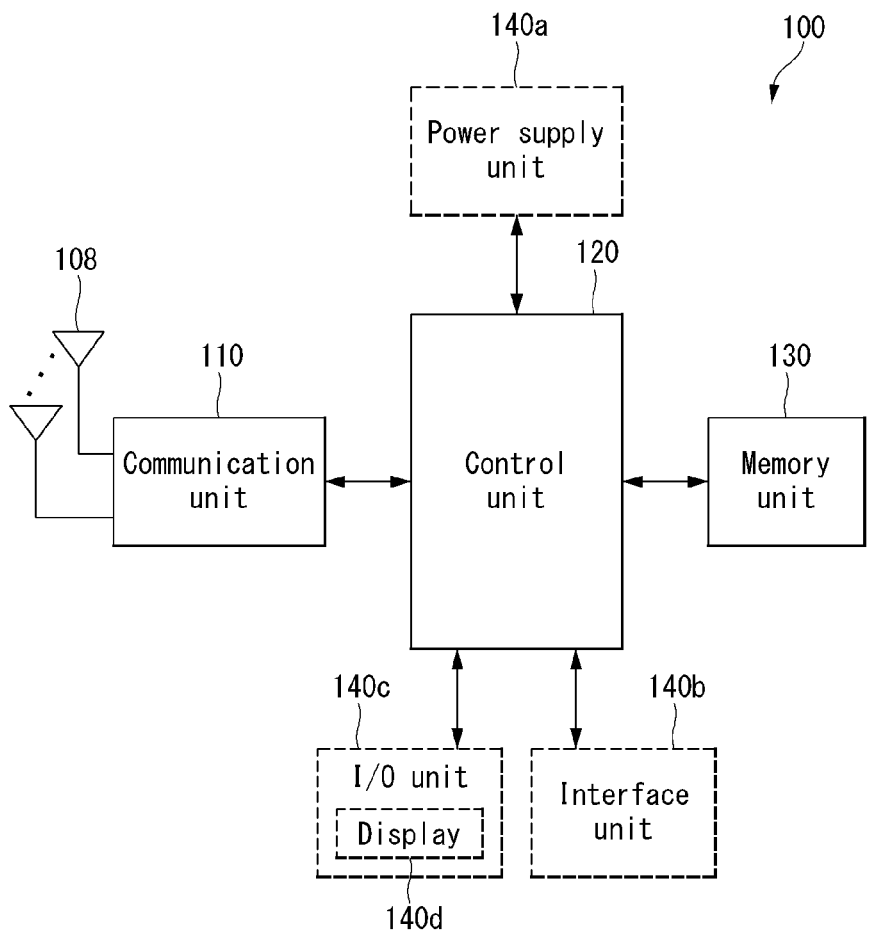
FIG. 17 illustrates a portable device applied to the disclosure.

FIG. 17 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 16, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data in the wireless communication system of the present disclosure has been described in connection with examples in which it applies to 3GPP LTE/LTE-A system and 5G systems (new RAT systems), the method is also applicable to other various wireless communication systems.

What is claimed is:

1. A method for transmitting and receiving, by a base station (BS), data in a wireless communication system, the method comprising:
transmitting first control information based on a first control resource set (CORESET) of a first CORESET group;
transmitting second control information based on a second CORESET of a second CORESET group;
transmitting at least one of (i) a first data scheduled based on the first control information or (ii) a second data scheduled based on the second control information; and receiving, first feedback information corresponded to the first data and second feedback information corresponded to the second data,
wherein an index of the first CORESET group and an index of the second CORESET group have different values,
wherein each of the first control information and the second control information includes a Downlink Assignment Index (DAI) field, and
wherein a value of the DAI field is configured based on the index of the first CORESET group and the index of the second CORESET group.

2. The method of claim 1,
wherein the value of the DAI field is configured further based on (i) an index of a serving cell and (ii) an order of monitoring occasions in which each control information is to be transmitted.

3. The method of claim 2, wherein the first control information and the second control information are transmitted from a same cell having a same serving cell index at a same monitoring occasion.

4. The method of claim 3, wherein for the same serving cell index and the same monitoring occasion, the value of the DAI field is configured in ascending order of the index of the first CORESET group and the index of the second CORESET group.

5. The method of claim 3, wherein based on a first value of the DAI field included in the first control information and a second value of the DAI field included in the second control information being equal to each other, a value of the DAI field corresponding to a lower index among the index of the first CORESET group and the index of the second CORESET group is replaced with a value acquired by subtracting 1 from the value of the DAI field corresponding to the lower index.

6. The method of claim 1, further comprising:
transmitting information for indicating to configure the first feedback information and the second feedback information jointly.

7. The method of claim 6, wherein the first feedback information and the second feedback information are jointly encoded and transmitted through one uplink channel, based on the information.

8. The method of claim 7, wherein the first feedback information and the second feedback information are encoded based on a bit number of feedback information having a larger payload size among the first feedback information and the second feedback information.

9. The method of claim 7, wherein the first control information and the second control information are configured as a pair, and
wherein the first feedback information and the second feedback information are encoded with a bit number corresponding to the sum of a bit number of the first feedback information and a bit number of the second feedback information.

10. The method of claim 1, further comprising:
transmitting configuration information related to a CORESET,
wherein the first CORESET group and the second CORESET group are configured based on the configuration information.

11. The method of claim 1, wherein based on a resource for the first feedback information and a resource for the second feedback information being overlapped with each other, one of the first feedback information or the second feedback information is dropped based on a priority rule.

12. The method of claim 11, wherein the priority rule is based on the value of the DAI field.

13. The method of claim 11, wherein the resource for the first feedback information and the resource for the second feedback information are included in a same sub slot.

14. The method of claim 1, wherein based on a resource for the first feedback information being overlapped with a resource for the second data, one of the first feedback information or the second data is dropped based on contents included in the second data.

15. A base station (BS) for transmitting and receiving data in a wireless communication system, the BS comprising:
one or more transceivers;
one or more processors; and
one or more memories storing instructions for operations executed by the one or more processors and connected to the one or more processors,
wherein the operations comprise:
transmitting first control information based on a first control resource set (CORESET) of a first CORESET group;
transmitting second control information based on a second CORESET of a second CORESET group;
transmitting at least one of (i) a first data scheduled based on the first control information or (ii) a second data scheduled based on the second control information; and
receiving, first feedback information corresponded to the first data and second feedback information corresponded to the second data,
wherein an index of the first CORESET group and an index of the second CORESET group have different values
wherein each of the first control information and the second control information includes a Downlink Assignment Index (DAI) field, and
wherein a value of the DAI field is configured based on the index of the first CORESET group and the index of the second CORESET group.

16. The BS of claim 15,
wherein the value of the DAI field is configured further based on (i) an index of a serving cell and (ii) an order of monitoring occasions in which each control information is to be transmitted.

17. The BS of claim 16, wherein the first control information and the second control information are transmitted from a same cell having a same serving cell index at a same monitoring occasion.

18. The BS of claim 17, wherein for the same serving cell index and the same monitoring occasion, the value of the DAI field is configured in ascending order of the index of the first CORESET group and the index of the second CORESET group.

19. One or more non-transitory computer-readable media storing one or more instructions, when executed by one or more processors, configure the one or more processors to perform operations,
wherein the operations comprise:
transmitting first control information based on a first control resource set (CORESET) of a first CORESET group;
transmitting second control information based on a second CORESET of a second CORESET group;
transmitting at least one of (i) a first data scheduled based on the first control information or (ii) a second data scheduled based on the second control information; and receiving, first feedback information corresponded to the first data and second feedback information corresponded to the second data, wherein an index of the first CORESET group and an index of the second CORESET group have different values, wherein each of the first control information and the second control information includes a Downlink Assignment Index (DAI) field, and wherein a value of the DAI field is configured based on the index of the first CORESET group and the index of the second CORESET group.

20. The one or more non-transitory computer-readable media of claim 19, wherein the value of the DAI field is configured further based on (i) an index of a serving cell and (ii) an order of monitoring occasions in which each control information is to be transmitted.

* * * * *